(12) United States Patent
Fok et al.

(10) Patent No.: US 8,818,389 B2
(45) Date of Patent: Aug. 26, 2014

(54) APPARATUS AND METHODS FOR DETERMINING CONNECTION QUALITY METRICS

(75) Inventors: Kenny Fok, San Diego, CA (US); Eric Chi Chung Yip, San Diego, CA (US); Jinghui Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1395 days.

(21) Appl. No.: 11/828,240

(22) Filed: Jul. 25, 2007

(65) Prior Publication Data

US 2008/0026768 A1   Jan. 31, 2008

Related U.S. Application Data

(60) Provisional application No. 60/833,563, filed on Jul. 26, 2006.

(51) Int. Cl.
- *H04W 72/00* (2009.01)
- *H04N 21/41* (2011.01)
- *H04W 24/08* (2009.01)
- *H04W 88/02* (2009.01)

(52) U.S. Cl.
CPC .............. *H04W 24/08* (2013.01); *H04W 88/02* (2013.01); *H04N 21/4126* (2013.01)
USPC .................. 455/452.2; 455/414.1; 455/422.1; 455/423; 455/424; 455/425; 455/452.1; 455/528; 455/552.1

(58) Field of Classification Search
USPC ............................ 455/414.1, 422.1, 423–425, 455/452.1–452.2, 528, 552.1
See application file for complete search history.

(56) References Cited

U.S. PATENT DOCUMENTS

| | | | |
|---|---|---|---|
| 6,108,316 A * | 8/2000 | Agrawal et al. ............... | 370/311 |
| 6,298,233 B1 | 10/2001 | Souissi et al. | |
| 6,856,802 B1 | 2/2005 | Kinnunen et al. | |
| 6,915,128 B1 | 7/2005 | Oh | |
| 7,349,692 B2 * | 3/2008 | Ko et al. ....................... | 455/423 |

(Continued)

FOREIGN PATENT DOCUMENTS

| | | |
|---|---|---|
| CN | 1358396 A | 7/2002 |
| EP | 0701382 | 3/1996 |

(Continued)

OTHER PUBLICATIONS

International Search Report—PCT/USO7/074524, International Search Authority—European Patent Office—Apr. 25, 2008.

(Continued)

*Primary Examiner* — Patrick Edouard
*Assistant Examiner* — Matthew Genack

(57) ABSTRACT

Apparatus and methods of determining a connection quality between a communication device and a communications network comprise receiving from the communication device at least one of a communication device processor-generated event code and a corresponding communication device processor-generated event data based on execution of a predetermined connection quality configuration by the communication device. The processor-generated event code and the processor-generated event data correspond to connection quality aspects of a communication between the communication device and the communications network. Additionally, this aspect of the method further comprises generating a connection quality characteristic associated with the communication according to analysis of at least one of the processor-generated event code and the processor-generated event data by a connection quality state machine, and storing the generated connection quality characteristic corresponding to the communication.

62 Claims, 26 Drawing Sheets

(56) References Cited

U.S. PATENT DOCUMENTS

| | | |
|---|---|---|
| 2003/0002525 A1* | 1/2003 | Grilli et al. .................. 370/465 |
| 2003/0186706 A1* | 10/2003 | Bergins et al. ............. 455/452.2 |
| 2004/0193709 A1 | 9/2004 | Selvaggi et al. |
| 2005/0163047 A1* | 7/2005 | McGregor et al. ............ 370/229 |
| 2005/0259976 A1* | 11/2005 | Shimoda et al. .............. 386/125 |
| 2007/0274291 A1* | 11/2007 | Diomelli ...................... 370/352 |

FOREIGN PATENT DOCUMENTS

| | | |
|---|---|---|
| JP | 2002543722 U | 12/2002 |
| TW | I222296 | 10/2004 |
| TW | I235566 | 7/2005 |
| WO | 0067507 | 11/2000 |
| WO | WO2005057899 A1 | 6/2005 |

OTHER PUBLICATIONS

Written Opinion—PCT/USO7/074524, International Search Authority—European Patent Office—Apr. 25, 2008.

International Preliminary Report on Patentability—The International Bureau of WIPO—Geneva, Switzerland—Jan. 27, 2009.

* cited by examiner

- Logcodes: 
  - Collected all the time
    - 0x1FFB - AMSS Event
      - GSM_HANDOVER_START, ID 430
      - GSM_HANDOVER_END, ID 431
      - WCDMA_INTER_RAT_HO_START, ID 477
      - CM CALL STATE, ID 416
      - MT_SMS_NOTIFY, ID 497
      - CM_CALL_EVENT_ORIG, ID 629 (MO, voice or data)
      - NAS MESSAGE RECEIVED, ID 454 (MO, for ALERTING)
      - WCDMA_PAGE_RECEIVED, ID 565 (MT, voice or data)
      - NAS MESSAGE SENT, ID 453 (MT, for ALERTING)
      - RRC_MESSAGE_SENT, ID 455
      - RRC_MESSAGE_RECEIVED, ID 456
      - UMTS_CALLS_STATISTICS, ID 623
      - SMS_STATISTICS, ID 970
      - CM DS INTERRAT STATE, ID 1021
      - MM_STATE, ID 1022
      - WCDMA_RL_FAILURE, ID 567,
      - GSM_OUT_OF_SERVICE, ID 437
      - WCDMA_OUT_OF_SERVICE, ID 619
      - WCDMA_RRC_PHYCHAN_EST_FAILURE, ID 628
      - WCDMA_PRACH, ID 1010
      - CM_SYSTEM_MODE, ID 418
- Failure Events Triggering data collection: 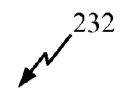
  - Collected all the time
    - 0x1FFB - AMSS Event
      - WCDMA_RL_FAILURE, ID 567, (For Access Failure, Call Drop)
      - GSM_OUT_OF_SERVICE, ID 437, (For Call Drop)
      - WCDMA_OUT_OF_SERVICE, ID 619, (For Access Failure, Call Drop)
      - WCDMA_RRC_PHYCHAN_EST_FAILURE, ID 628 (For Access Failure)
      - WCDMA_PRACH, ID 1010, (For Access Failure)
      - CM_SYSTEM_MODE, ID 418 (only for OOS)

FIG. 16

- Additional events for use with algorithm:
  - CM_CALL_STATE, ID 416 ← 234
    - CM Call State
      - Packet Format
        » cm_call_state 1byte
      - cm_call_state :
        » -1 - None
        » 0 - Idle
  - CM_CALL_EVENT_ORIG, ID 629 (MO, voice or data)
    - Access Origination Event
    - CM Call Origination
      - Packet Format ← 236
        » call_id    1 byte
        » call_type  1 byte
        » srv_type   2 bytes
      - Call Type values
        » 0 - CM_CALL_TYPE_VOICE
        » 1 - CM_CALL_TYPE_CS_DATA
        » 2 - CM_CALL_TYPE_PS_DATA
        » 3 - CM_CALL_TYPE_SMS
        » 4 - CM_CALL_TYPE_PD
        » 5 - CM_CALL_TYPE_TEST
        » 6 - CM_CALL_TYPE_OTAPA
        » 7 - CM_CALL_TYPE_STD_OTASP
        » 8 - CM_CALL_TYPE_NON_STD_OTASP
        » 9 - CM_CALL_TYPE_EMERGENCY
      - Service Type Values:
        » 0 - CM_SRV_TYPE_AMPS
        » 1 - CM_SRV_TYPE_HDR
        » 2 - CM_SRV_TYPE_CDMA_SPECIFIC
        » 3 - CM_SRV_TYPE_CDMA_AUTOMATIC
        » 4 - CM_SRV_TYPE_AUTOMATIC
        » 5 - CM_SRV_TYPE_CDMA_HDR
        » 6 - CM_SRV_TYPE_GSM_WCDMA

FIG. 17

- GSM_HANDOVER_START (ID 430)/GSM_HANDOVER_END (ID 431)    ← 238    ← 240
  - RRC message sent/received
    - Packet Format
      - » handoverType    1 byte
      - » bcch_arfcn    2 byte
      - » bsic    1 byte
      - » handoverRef    1 byte
    - handoverType
      - » 0 - GSM to GSM
      - » 1 - WCDMA to GSM
      - » 2 - GSM to WCDMA    ← 242
- WCDMA_INTER_RAT_HO_START, ID 477
  - Indicates receipt of a handover command and provides the details of the message. The data is captured as soon as the RRC detects that a Handover from UTRAN COMMAND is received.
    - Packet Format
      - » wcdma_handover    1 byte
      - » activation    1 byte
      - » activation_cfn    1 byte
      - » receive_cfn    1 byte
    - wcdma_handover
      - » 0 - Handover to GSM
      - » 1 - Handover to cdma2000
- MM State (ID 1022)
  - MM State
    - Packet Format    ← 244
      - » MMState    5 bits
      - » MMStatus    3 bits
      - » MMIdleSubstate    1 byte
    - MMState
      - » 0 - MM_NULL
      - » 19 - MM_IDLE

FIG. 18

246                              248
- NAS MESSAGE SENT (ID 453 )/ NAS MESSAGE RECEIVED ( ID 454 )
  • NAS message received
    - Packet Format
      » message_id_set  2 bytes
      » message_set     1 byte
      » Channel         1 byte
    - message_id_set
      » 769 - ALERTING
      » 805 - DISCONNECT
      » 813 - RELEASE
      » 1316 - CM_SERVICE_REQUEST
      » 2308 - CP_ACK
      » 2626 - ACTIVATE_PDP_ACCEPT
      » 2630 - DEACTIVATE_PDP_REQUEST
      » 2631 - DEACTIVATE_PDP_ACCEPT
    - message_set :
      » 3 - PD_CC
      » 4 - PD_GTTP
      » 5 - PD_MM
      » 6 - PD_RR
      » 8 - PD_GMM
      » 9 - PD_SMS
      » 10 - PD_GPRS_SM        250                      252
      » 11 - PD_SS
- RRC MESSAGE SENT (ID 455)/RRC MESSAGE RECEIVED (ID 456)
  • RRC message sent/received
    - Packet Format
      » logical_chan    1 byte
      » sig_mess_type   1 byte
    - sig_mess_type
      » 36 - RRC_CONNECTION_RELEASE_COMP_MSG
      » 37 - RRC_CONNECTION_REQUEST_MSG
      » 39 - RRC_CONNECTION_SETUP_COMPLETE

FIG. 19

- MT_SMS_NOTIFY, ID 497  ← 254
  • MT Short Message Notify
    - Packet Format
      » mem_type,    1 byte
      » Msg_index,   4 bytes
- SMS_Statistics, ID 970  ← 256
  • SMS Statistics
    - Packet Format
      » transactionType   4 byte
      » messageID         1 byte
      » cause             1 byte
    - transactionType
      » 0 - cell immediate display
- WCDMA_PAGE_RECEIVED, ID 565  ← 258
  • Access Origination Event in UMTS v2
  • Page received
- Packet Format
      » paging_type    1 byte
      » paging_cause   1 byte
    - paging_cause :
      » 0 - RRC_PAGE_CAUSE_TERM_CONV_CALL
      » 1 - RRC_PAGE_CAUSE_TERM_STREAM_CALL
      » 2 - RRC_PAGE_CAUSE_TERM_INTERACT_CALL
      » 3 - RRC_PAGE_CAUSE_TERM_BACKGND_CALL
      » 4 - RRC_PAGE_CAUSE_SMS
      » 5 - RRC_PAGE_CAUSE_HIGH_PRI_SIGNALLING
      » 6 - RRC_PAGE_CAUSE_LOW_PRI_SIGNALLING
      » 7 - RRC_PAGE_CAUSE_UNKNOWN

FIG. 20

- UMTS_CALLS_STATISTICS, ID 623 
  • UMTS NAS Call Stats
    - Packet Format
      » call_statistic 1 byte
    - call_statistic :
      » 1 - Mobile initiated normal voice call attempted
      » 2 - Mobile initiated emergency voice call attempted
      » 3 - Mobile initiated circuit switch data call attempted
      » 4 - Mobile initiated call - connected
      » 11 - MO call - mobile initiated call clearing from conversation state
      » 12 - MO call - network initiated call clearing from connected state
      » 13 - MO call - mobile aborted before the call is connected
      » 14 - MO call - network aborted before the call is connected
      » 15 - MO call - ended
      » 16 - MO call - unexpected call ended from radio link failure
      » 21 - Network initiated normal voice or data call attempted
      » 22 - MT call - connected
      » 31 - MT call - mobile initiated call clearing
      » 32 - MT call - network initiated call clearing
      » 33 - MT call - mobile aborted before the call is connected
      » 34 - MT call - network aborted before the call is connected
      » 35 - MT call - ended
      » 36 - MT call - unexpected call ended from radio link failure

FIG. 21

- CM DS INTERRAT STATE, ID 1021
  • Indicates DS interrat state
    - Packet Format
      » dataSuspended   1byte
      » activeRAT       1 byte
    - dataSuspended
      » 0 - Data Resumed
      » 1 - Data Suspended
    - activeRAT
      » 0 - No Service
      » 1 - AMPS
      » 2 - CDMA
      » 3 - GSM
      » 4 - HDR
      » 5 - WCDMA
      » 6 - GPS

- Description for event outputs
  - UMTS Call Drop ←—266
  - Log Code ←—268
    - 0xF001
  - Cause Code ←—270
    1 - CM_IDLE
    2 - MM_IDLE
    3 - MB_ABORT
    4 - NW_ABORT
    5 - LINK_FAILURE
    6 - UNEXP_RELEASE
    8 - GSM_OOS
    9 - WCDMA_OOS
    12 - CM_SYS_MODE_OOS
  - Call Type Index ←—272
    0 - CALL_TYPE_INVALID
    1 - MO_VOICE
    2 - MO_DATA
    3 - MO_OTHER
    4 - MT_VOICE
    5 - MT_DATA
    6 - MT_OTHER

FIG. 23

- UMTS Access Failure ←—274
  • Log Code ←—276
    - 0xF002
  • Cause Code ←—278
    1 - CM_IDLE
    2 - MM_IDLE
    3 - MB_ABORT
    4 - NW_ABORT
    5 - LINK_FAILURE
    6 - UNEXP_RELEASE
    8 - GSM_OOS
    9 - WCDMA_OOS
    10 - WCDMA_RRC_PC_EST_FAIL
    11 - WCDMA_PRACH
    12 - CM_SYS_MODE_OOS
  • Call Type Index ←—280
    0 - CALL_TYPE_INVALID
    1 - MO_VOICE
    2 - MO_DATA
    3 - MO_OTHER
    4 - MT_VOICE
    5 - MT_DATA
    6 - MT_OTHER

FIG. 24

- UMTS Call Connect ←—282
  - Log Code ←—284
    - 0xF003
  - Cause Code ←—286
    - 453 - NAS_SENT
    - 454 - NAS_RCVD
    - 497 - MT_SMS_NOTIFY
  - Call Type Index ←—288
    - CALL_TYPE_INVALID 0
    - 1 - MO_VOICE
    - 2 - MO_DATA
    - 3 - MO_OTHER
    - 4 - MT_VOICE
    - 5 - MT_DATA
    - 6 - MT_OTHER
- UMTS Access Attempt ←—290
  - Log Code ←—292
    - 0xF004
  - Cause Code ←—294
    - 629 - CALL EVENT ORIG (call access detected during another call)
    - 565 - WCDMA PAGE RCVD (call access detected during another call)
    - 453 - NAS_SENT (call access detected during another call)
    - 454 - NAS_RCVD (call access detected during another call)
    - 455 - RRC_SENT (call access detected while mobile is idle)
    - 456 - RRC_RCVD (call access detected while mobile is idle)
  - Call Type Index ←—296
    - CALL_TYPE_INVALID 0
    - 1 - MO_VOICE
    - 2 - MO_DATA
    - 3 - MO_OTHER
    - 4 - MT_VOICE
    - 5 - MT_DATA
    - 6 - MT_OTHER

FIG. 25

- In Service (INS) COUNT ←—298
  - Log Code ←—300
    - 0xF00B
  - Cause Code ←—302
    - 1 - CM_SYSTEM_MODE_AMPS
    - 2 - CM_SYSTEM_MODE_CDMA
    - 3 - CM_SYSTEM_MODE_GSM
    - 4 - CM_SYSTEM_MODE_HDR
    - 5 - CM_SYSTEM_MODE_WCDMA
    - 6 - CM_SYSTEM_MODE_GPS
  - Call Type Index ←—304
    - User configurable
- Out Of Service (OOS) COUNT ←—306
  - Log Code ←—308
    - 0xF00C
  - Cause Code ←—310
    - 0 - CM_SYSTEM_MODE_OOS
  - Call Type Index ←—312
    - User configurable

APPARATUS AND METHODS FOR DETERMINING CONNECTION QUALITY METRICS

CLAIM OF PRIORITY UNDER 35 USC §119

The present Application for Patent claims priority to Provisional Application No. 60/833,563 entitled "APPARATUS AND METHODS FOR DETERMINING CONNECTION QUALITY METRICS" filed Jul. 26, 2006, and assigned to the assignee hereof and hereby expressly incorporated by reference herein.

BACKGROUND

The disclosed embodiments relate to wireless devices and wireless communication networks, and more particularly, to apparatus and methods for determining a connection quality of a wireless device on a wireless network.

Wireless communications devices, such as mobile phones, pagers, handheld computers, etc., are becoming increasingly popular for both business and personal use. One advantage of such devices is their "wireless" aspect, allowing them to be utilized whenever and wherever a user desires. As the use of wireless devices grow, and as the associated wireless communications networks grow, users have an ever-increasing expectation of being able to connect with a wireless network at any location. Thus, one aspect of user satisfaction when utilizing a wireless device deals with the ability of the wireless device to establish a communications connection with a wireless network, as well as the ability of the wireless device to maintain that connection.

SUMMARY

In some aspects, a method of determining a connection quality between a communication device and a communications network comprises receiving from the communication device at least one of a communication device processor-generated event code and a corresponding communication device processor-generated event data based on execution of a predetermined connection quality configuration by the communication device. The processor-generated event code and the processor-generated event data correspond to connection quality aspects of a communication between the communication device and the communications network. Additionally, this aspect of the method further comprises generating a connection quality characteristic associated with the communication according to analysis of at least one of the processor-generated event code and the processor-generated event data by a connection quality state machine, and storing the generated connection quality characteristic corresponding to the communication.

In another aspect, at least one processor is configured to determine a connection quality between a communication device and a communications network. The at least one processor comprises a first module for receiving from the communication device at least one of communication device processor-generated event code and corresponding communication device processor-generated event data based on execution of a predetermined connection quality configuration by the communication device. The processor-generated event code and the processor-generated event data correspond to connection quality aspects of a communication between the communication device and the communications network. Further, the at least one processor comprises a second module for generating a connection quality characteristic associated with the communication according to analysis of at least one of the processor-generated event code and the processor-generated event data by a connection quality state machine. Additionally, the at least one processor comprises a third module for storing the generated connection quality characteristic corresponding to the communication.

In an aspect, a computer program product comprises a computer-readable medium comprising a plurality of sets of codes. The computer-readable medium comprises a first set of codes for causing a computer to receive from the communication device at least one of a communication device processor-generated event code and corresponding communication device processor-generated event data based on execution of a predetermined connection quality configuration by the communication device. The processor-generated event code and the processor-generated event data correspond to connection quality aspects of a communication between the communication device and the communications network. Also, the computer-readable medium comprises a second set of codes for causing the computer to generate a connection quality characteristic associated with the communication according to analysis of at least one of the processor-generated event code and the processor-generated event data by a connection quality state machine. Additionally, the computer-readable medium comprises a third module for storing the generated connection quality characteristic corresponding to the communication.

In another aspect, a network device comprises means for receiving from the communication device at least one of a communication device processor-generated event code and corresponding communication device processor-generated event data based on execution of a predetermined connection quality configuration by the communication device. The processor-generated event code and the processor-generated event data correspond to connection quality aspects of a communication between the communication device and the communications network. Also, the network device comprises means for generating a connection quality characteristic associated with the communication according to analysis of at least one of the processor-generated event code and the processor-generated event data by a connection quality state machine. Additionally, the network device comprises means for storing the generated connection quality characteristic corresponding to the communication.

In a further aspect, a network device comprises a memory comprising a connection quality state machine and at least one of a communication device processor-generated event code and a corresponding communication device processor-generated event data based on execution of a predetermined connection quality configuration by a respective communication device. The processor-generated event code and the processor-generated event data correspond to connection quality aspects of a communication between the communication device and a communications network. Additionally, the network device comprises a processor operable to execute the connection quality state machine with respect to at least one of the communication device processor-generated event code and the communication device processor-generated event data to generate and store in the memory a connection quality characteristic associated with the communication.

In yet another aspect, a method of gathering information to determine a connection quality between a communication device and a communications network comprises receiving at the communication device a collection configuration. In this aspect, the method further comprises generating at a processing engine of the communication device a plurality of event codes each having a corresponding plurality of event data based on communications between the communication device and a communications network. The plurality of event codes and the corresponding plurality of event data correspond to at least one connection quality characteristic of the communications. Additionally, in this aspect, the method further comprises choosing at least one selected event information from the plurality of event codes and the corresponding plurality of event data based on the collection configuration. Further, in this aspect, the method comprises forwarding the at least one selected event information for analysis by a connection quality state machine to determine at least one connection quality characteristic associated with the communications.

In a related aspect, at least one processor is configured to gather information to determine a connection quality between a communication device and a communications network. The at least one processor comprises a first module for receiving at the communication device a collection configuration. Further, the at least one processor comprises a second module for generating at a processing engine of the communication device a plurality of event codes each having a corresponding plurality of event data based on communications between the communication device and a communications network, wherein the plurality of event codes and the corresponding plurality of event data correspond to at least one connection quality characteristic of the communications. Also, the at least one processor comprises a third module for choosing at least one selected event information from the plurality of event codes and the corresponding plurality of event data based on the collection configuration. Additionally, the at least one processor comprises a fourth module for forwarding the at least one selected event information for analysis by a connection quality state machine to determine at least one connection quality characteristic associated with the communications.

In another aspect, a computer program product comprises a computer-readable medium comprising a plurality of codes. The computer-readable medium comprises a first set of codes operable to cause a computer to receive at the communication device a collection configuration. Also, the computer-readable medium comprises a second set of codes operable to cause the computer to generate at a processing engine of the communication device a plurality of event codes each having a corresponding plurality of event data based on communications between the communication device and a communications network. The plurality of event codes and the corresponding plurality of event data correspond to at least one connection quality characteristic of the communications. Additionally, the computer-readable medium comprises a third set of codes operable to cause the computer to choose at least one selected event information from the plurality of event codes and the corresponding plurality of event data based on the collection configuration. Further, the computer-readable medium comprises a fourth set of codes operable to cause the computer to forward the at least one selected event information for analysis by a connection quality state machine to determine at least one connection quality characteristic associated with the communications.

In still another aspect, a communication device comprises means for receiving at the communication device a collection configuration. Also, in this aspect, the communication device comprises means for generating at a processing engine of the communication device a plurality of event codes each having a corresponding plurality of event data based on communications between the communication device and a communications network. The plurality of event codes and the corresponding plurality of event data correspond to at least one connection quality characteristic of the communications. Further, in this aspect, the communication device comprises means for choosing at least one selected event information from the plurality of event codes and the corresponding plurality of event data based on the collection configuration. Additionally, in this aspect, the communication device comprises means for forwarding the at least one selected event information for analysis by a connection quality state machine to determine at least one connection quality characteristic associated with the communications.

In a still further aspect, a communication device comprises a processing engine operable to generate a plurality of event codes each having a corresponding plurality of event data based on communications between the communication device and a communications network. The plurality of event codes and the corresponding plurality of event data correspond to at least one connection quality characteristic of the communications. Further in this aspect, the communication device additionally comprises a memory in communication with the processing engine, where the memory comprises a connection quality module, a collection configuration and at least one selected event information. The connection quality module is executable by the processing engine to chose the at least one selected event information from the plurality of event codes and the corresponding plurality of event data according to the collection configuration. Further, the selected event information is operable to define at least one connection quality characteristic associated with the communications according to application of a connection quality state machine.

BRIEF DESCRIPTION OF THE DRAWINGS

The disclosed embodiments will hereinafter be described in conjunction with the appended drawings provided to illustrate and not to limit the disclosed embodiments, wherein like designations denote like elements, and in which:

FIGS. 16-26 illustrate examples of event information 36 generated by processing engine 38 of communication device 22 in one aspect of connection quality determination system 20 of FIG. 1;

DETAILED DESCRIPTION

The disclosed embodiments include apparatus, including processors and computer readable media, and methods relating to the determination of connection characteristics, such as an access failure and/or a call drop, associated with communications between a wireless device and a wireless network. These apparatus and methods monitor and collect predetermined event codes and associated event data generated by the processing engine of the wireless device based on communications messages, such as over-the-air messages, and/or other state information of components of the wireless device. The use of processor-generated event information provides an efficient and compact piece of data which contains detailed information relating to one or more causes of the event and, optionally, a type of call associated with the event. Further, these apparatus and methods apply a connection quality state machine to the collected event information to determine connection quality characteristics and/or metrics, such as access failure-related events and/or call drop-related events associated with the operation of the wireless device on the wireless network. The state machine may compile these characteristics and/or metrics from a communication device-user perspective and/or from a system perspective, thus advantageously providing either or both points of view. Further, through the processor-generated event information, the state machine is operable to differentiate between user-perceived connection quality characteristics and network-perceived connection quality characteristics. The described apparatus and methods are particularly suited for communications protocols without standardized connection-quality-related event mechanisms, such as, but not limited to, the Universal Mobile Telephone System ("UMTS") protocol.

Figure 1:
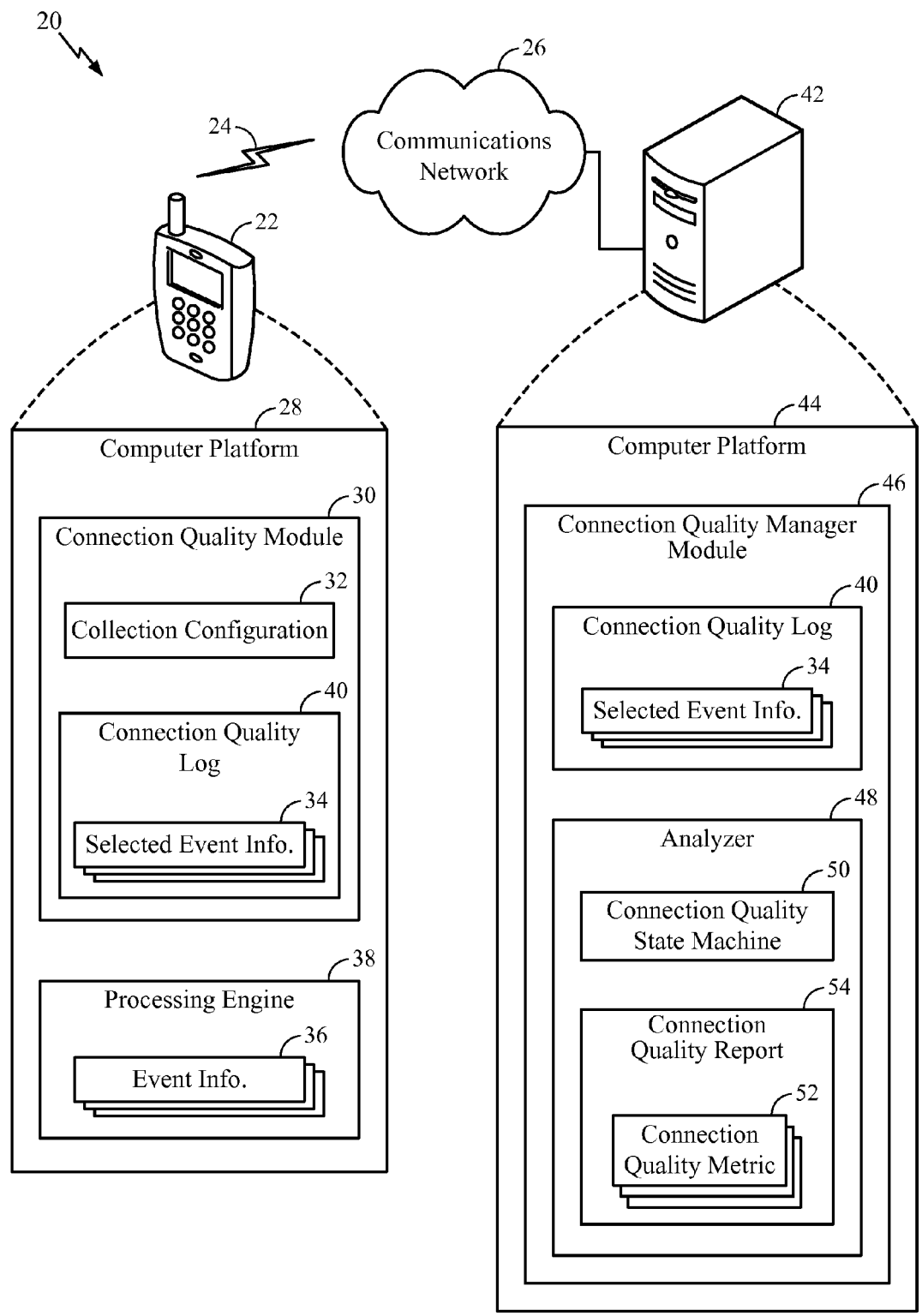
FIG. 1 is a schematic diagram of functional components of an aspect of a system for determining connection quality characteristics or metrics associated with communications between at least one communication device and a communication network.

Referring to FIG. 1, in one aspect, a system 20 for determining connection quality characteristics comprises a communication device 22 operable for exchanging communications 24 with a communications network 26. For example, communication device 22 may comprise a wireless cellular telephone, which may enable a user to exchange communications 24, such as voice and/or data messages and/or packets, with another communication device and/or with a network device also in communication with communications network 26. Communication device 22 may include a computer platform 28, which may be operable to store and execute a connection quality module 30. Based on a collection configuration 32, which may be varied depending on the information of interest, connection quality module 30 is operable to monitor and/or collect selected event information 34 from a plurality of event information 36 generated by processing engine 38 in association with communications 24. Further, for example, the plurality of event information 36 may comprise processor-generated event codes and corresponding event data based on and/or representing some portion and/or some combination of one or more communication messages 24 exchanged between communication device 22 and communication network 26. In some aspects, these communication messages 24 comprise over-the-air (OTA) messages and/or data packets generated based on a given communication protocol utilized by communication device 22 and communication network 26. Optionally, or in addition, for example, the plurality of event information 36 may comprise processor-generated event codes and corresponding event data based on and/or representing state information of some portion or some combination of one or more hardware and/or software components of communication device 22. For example, the state information may indicate user interface information perceived by the user of the communication device, which may be different from operations occurring out of the perception of the user, such as operations occurring in background processes or between the communication device and the communication network. In some aspects, for example, the selected event information 34 may be accumulated and stored in a connection quality log 40. Further, the selected event information 34 may correspond to one or some combination of connection quality characteristics and/or metrics desired to be monitored with respect to operations of communication device 22 on communication network 26.

In some aspects, system 20 may further comprise a network device 42, such as a user manager server, operable to receive and/or retrieve collection quality log 40 and/or the selected event information 34 from communication device 22. Network device 42 may include a computer platform 44 operable to store and execute a connection quality manager module 46. Connection quality manager module 46 may include an analyzer 48 operable to apply a connection quality state machine 50 to the selected event information 34 and generate a corresponding one or more connection quality metrics 52, such as in a connection quality report 54. In particular, connection quality state machine 50 associates at least a portion of one or some combination of a plurality of the selected event information 34 with a predetermined one or more connection quality characteristics, such as an access failure and/or a call drop and/or an out of service state.

Further, connection quality state machine 50 may generate connection quality characteristics from a communication device user perspective, and/or from a communication network perspective. For example, prior to connecting a voice call, communication device 22 may provide an indication, such as a moving graphic, on the user interface to indicate that the device is in the process of connecting the call. When the call is connected, from a user perspective, connection quality state machine 50 may generate a record that includes one call attempt and one call success. Meanwhile, running in the background during the call attempt, the call connection process on communication device 22 may have a number of failed attempts and retries prior to being able to connect the call. As such, from the network perspective, connection quality state machine 50 may record three call attempts, two access failures, and one access success.

Thus, connection quality manager module 44 may utilize one connection quality characteristic, and/or some combination of connection quality characteristics, to define one or more connection quality metrics 52, such as numbers and/or rates of access failures, number and/or rates of call drops and/or number and/or rate of out of service states. An operator of network device 42, and/or any other interested, may then receive, or otherwise access, and analyze connection quality report 54 and/or one or more connection quality metrics 52 in order to monitor the performance of communication device 22 and/or communication network 26.

Figure 2:
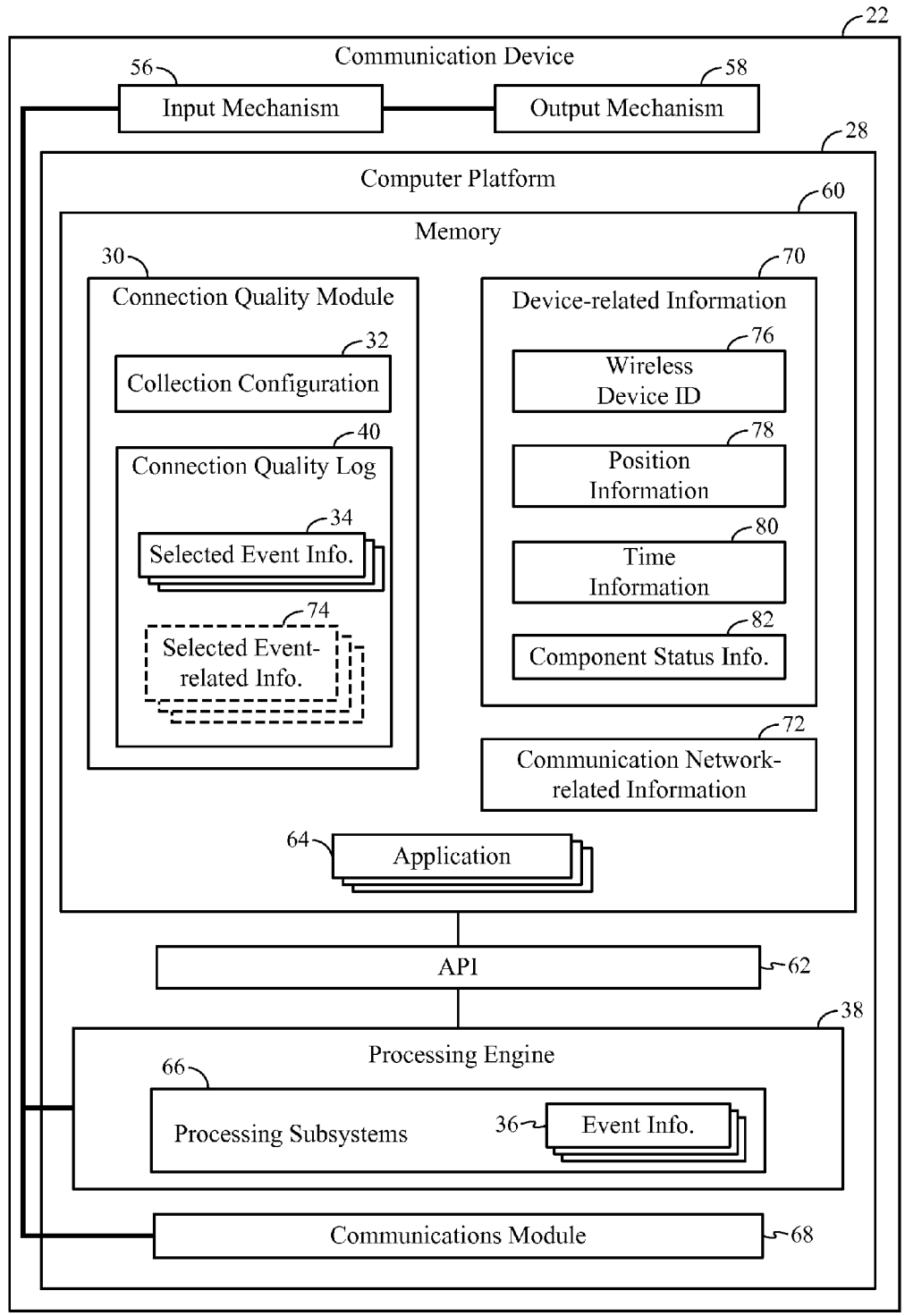
FIG. 2 is a schematic diagram of functional components of an aspect of the communication device of FIG. 1.

Referring to FIG. 2, according to one aspect, communication device 22 may comprise any type of computerized, communication device. For example, communication device 22 may include, but is not limited to, a cellular telephone, a Personal Digital Assistant (PDA), a two-way text pager, a portable computer having a wired or wireless communication portal, and any type of computer platform having a wireless communications portal, and which also may have a wired connection to a network or the Internet. Communication device 22 can be a remote-slave or other similar device, such as remote sensors, diagnostic tools, data relays, and the like, which does not have an end-user thereof, but which simply communicates data across a wireless or wired network. In alternate aspects, communication device 22 may be a wired communication device, such as a landline telephone, personal computer, set-top box or the like. Therefore, the present apparatus and methods can accordingly be performed on any form of wired or wireless device or computer module, including a wired or wireless communication portal, including without limitation, wireless modems, PCMCIA cards, access terminals, personal computers, telephones, or any combination or sub-combination thereof.

Additionally, communication device 22 may include an input mechanism 56 for generating inputs into the device, and an output mechanism 58 for generating information for consumption by the user of the device. For example, input mechanism 56 may include a mechanism such as a keypad or keyboard, a mouse, a touch-screen display, a microphone in association with a voice recognition module, etc. In certain aspects, input mechanism 56 may provide for user input associated with one or more of the plurality of event information 36. Further, for example, output mechanism 58 may include a display, an audio speaker, a haptic feedback mechanism, etc. Output mechanism 58 may generate a graphical user interface, a sound, a feeling such as a vibration, etc., and such outputs may be associated with one or more of the plurality of event information 36.

Further, communication device 22 may include computer platform 28 that can transmit data across wireless network or, in some aspects, a wired network, and that can receive and execute routines and applications and display data, and which interacts with input mechanism 56 and output mechanism 58. Computer platform 28 may include a memory 60, which may comprise volatile and nonvolatile memory portions, such as read-only and/or random-access memory (RAM and ROM), EPROM, EEPROM, flash cards or flash memory cells, and/or any memory common to computer platforms. Further, memory 60 may include active memory and storage memory, including an electronic file system and any secondary and/or tertiary storage device, such as magnetic media, optical media, tape, or soft or hard disk.

Further, computer platform 28 may also include processing engine 38, which may be an application-specific integrated circuit ("ASIC"), or other chipset, processor, logic circuit, or other data processing device. In some aspects, such as when communication device 22 comprises a cellular telephone, processing engine 38 or other processor such as ASIC may execute an application programming interface ("API") layer 62 that interfaces with any resident programs or applications 64, such as voice, data, and media-related applications and connection quality module 30, in memory 60. API 62 may be a runtime environment executing on the respective communication device. One such runtime environment is Binary Runtime Environment for Wireless® (BREW®) software developed by Qualcomm, Inc., of San Diego, Calif. Other runtime environments may be utilized that, for example, operate to control the execution of applications on wireless computing devices.

Additionally, processing engine 38 may include various processing subsystems 66 embodied in hardware, firmware, software, and combinations thereof, that enable the functionality of communication device 22 and the operability of the communication device on communications network 26 (FIG. 1). For example, processing subsystems 66 allow for initiating and maintaining communications, and exchanging data, with other networked devices as well as within and/or among components of communication device 22. In one aspect, such as in a cellular telephone, communications processing engine 38 may include one or a combination of processing subsystems 66, such as: sound, non-volatile memory, file system, transmit, receive, searcher, layer 1, layer 2, layer 3, main control, remote procedure, handset, power management, diagnostic, digital signal processor, vocoder, messaging, call manager, Bluetooth® system, Bluetooth® LPOS, position determination, position engine, user interface, sleep, data services, security, authentication, USIM/SIM (universal subscriber identity module/subscriber identity module), voice services, graphics, USB (universal serial bus), multimedia such as MPEG (Moving Picture Experts Group) protocol multimedia, GPRS (General Packet Radio Service), etc. For the disclosed aspects, processing subsystems 66 of processing engine 38 may include any subsystem components that interact with applications executing on computer platform 28.

Computer platform 28 may further include a communications module 68 which enables communications among the various components of communication device 12, as well as between the device and communications network 26. Communications module 68 may be embodied in hardware, firmware, software and/or combinations thereof. Further, communications module 68 is operable to receive information, such as configuration message 30, and transmit information, such as connection quality log 40 and/or selected event information 34 in accordance with the apparatus and methods described herein.

Additionally, in some aspects, memory 60 may further include device-related information 70 and communication network-related information 72, which may be collected as event-related information 74 along with selected event information 34. For example, device-related information 70 may include, but is not limited to: a communication device identifier 76 that uniquely identifies the given communication device; position information 78 which identifies a location of the communication device, such as geographical location data from a Global Positioning System (GPS) or assisted-GPS (A-GPS) system and/or nearby network device information which can be used to determine the approximate location of the communication device; time information 80 that identifies a device-based and/or network-based time; and component status information 82 that identifies the presence and/or state of any component on the communication device, such as indicating executing applications, a state of any portion of a hardware and/or software component, etc. Further, for example, communication network-related information 72 may include, but is not limited to, network components in communication with communication device 22, protocols, and/or any other network-based information associated with communications 24. Thus, device-related information 70 and communication network-related information 72 may be utilized to document the state of the environment of communication device 22 corresponding to the occurrence of one or more of the selected event information 34. In some aspects, some portion of device-related information 70 and/or some portion of communication network-related information 72 may be recorded in connection quality log 40 as selected event-related information 74 in order to maintain a record of the state of communication device 22 during the collection of selected event information 34.

Additionally, it should be noted that collection configuration 32 may also be recorded in connection quality log 40 in order to maintain a record of the parameters used to initiate the collection of selected event information 34 and/or selected event-related information 74.

Further, while the plurality of event information 36 are illustrated as being within processing subsystems 66, it should be understood that the plurality of event information 36 may be generated and/or located anywhere within processing engine 38.

Figure 3:
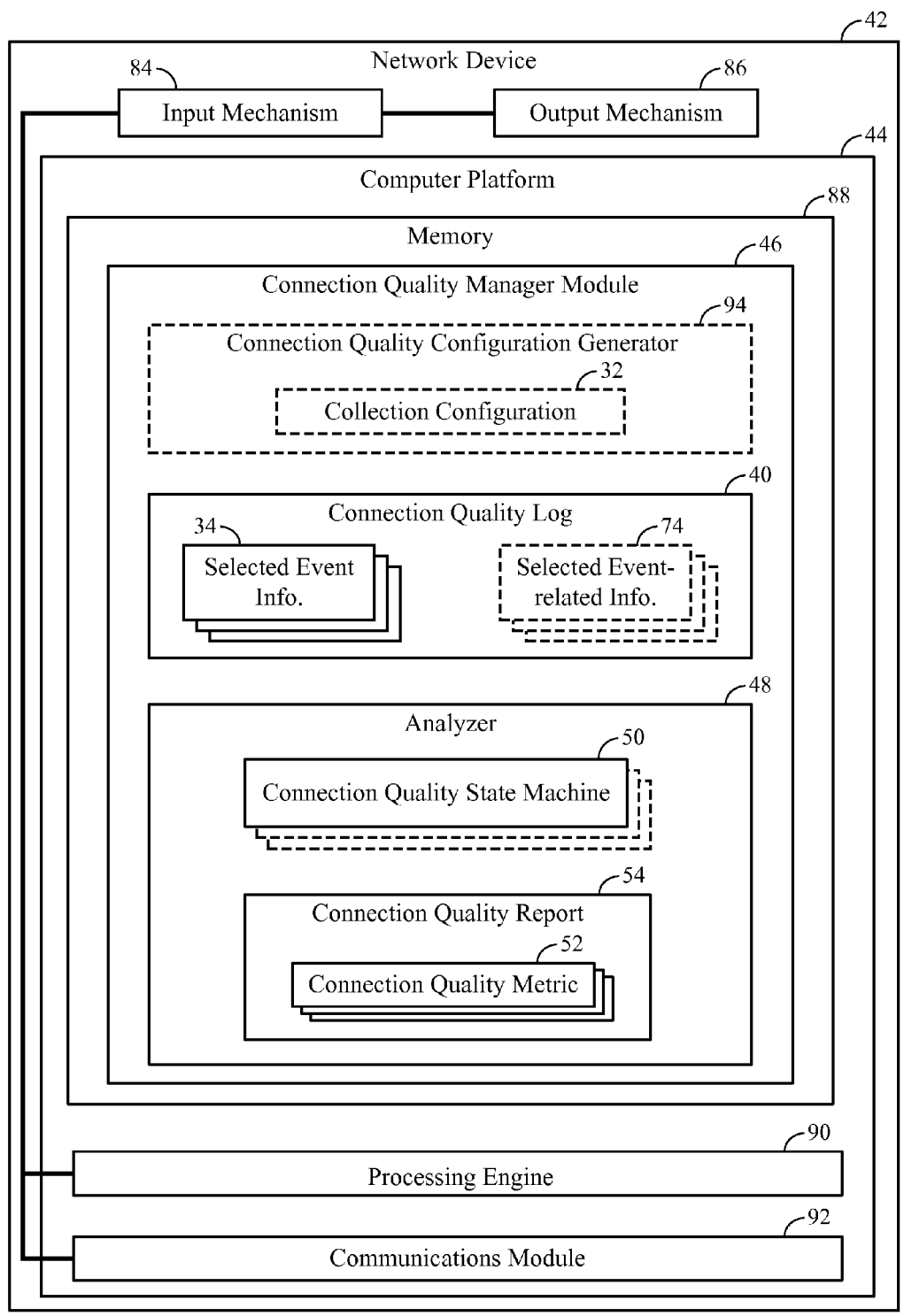
FIG. 3 is a schematic diagram of functional components of an aspect of the network device of FIG. 1.

Referring to FIG. 3, in one aspect, network device 42 may comprise at least one of any type of server, personal computer, mini computer, mainframe computer, or any general or special purpose computing device. Further, a single or some combination of network devices may operate or execute the modules and applications described herein.

Additionally, network device 42 may include an input mechanism 84 for generating inputs into the device, and an output mechanism 86 for generating information for consumption by the user of the device. For example, input mechanism 84 may include a mechanism such as a keypad or keyboard, a mouse, a touch-screen display, a microphone in association with a voice recognition module, etc. In certain aspects, for example, input mechanism 84 may provide for user input associated with operation of analyzer 48 and/or reviewing of connection quality report 54. Further, for example, output mechanism 86 may include a display, an audio speaker, a haptic feedback mechanism, etc. Output mechanism 86 may generate a graphical user interface, a sound, a feeling such as a vibration, etc., and such outputs may be represent one or more aspects of connection quality report 54 and/or connection quality metric 52.

Network device 42 may include computer platform 44 that can transmit and receive data across a wireless or wired network, and that can execute routines and applications, and which interacts with input mechanism 84 and output mechanism 86. Computer platform 44 may include a memory 88, which may comprise volatile and nonvolatile memory such as read-only and/or random-access memory (RAM and ROM), EPROM, EEPROM, flash cards or flash memory cells, or any memory common to computer platforms. Further, memory 88 may comprise active memory and/or longer term memory for storage, including any secondary or tertiary storage device, such as magnetic media, optical media, tape, or soft or hard disk. Further, computer platform 44 also may include a processing engine 90, which may be an application-specific integrated circuit ("ASIC"), or other chipset, processor, logic circuit, or other data processing device.

Additionally, computer platform 44 may include a communications module 92 which enables communications among the various components of the device, as well as between the device and communications network 26. For example, in the described aspects, communication module 92 is operable to transmit collection configuration 32 and to receive communication quality log 40 and/or connection quality metric 52. Communications module 92 may be embodied in hardware, firmware, software and/or combinations thereof.

As noted above, computer platform 44 includes connection quality manager module 46 for collecting and analyzing selected event information 34 and determining connection quality metric 52. In some aspects, connection quality manager module 46 may further include connection quality configuration generator 94, which is operable to generate connection quality configuration 32 for use by communication device 22. In particular, connection quality configuration generator 94 may include logic operable to present a user with menus from which to input and/or select desired connection quality metrics, and/or connection quality characteristics, and/or event codes and associated event data, to collect from one or more identified and/or selected communication devices 22. Connection quality configuration generator 94 thereby allows a user to generate collection configuration 32, which is operable by communication device 22 to choose selected event information 34 from the plurality of event information 36, where selected event information 34 is associated with the desired connection quality characteristic or metric 52 of interest to the user. In some aspects, collection configuration 32 may identify predetermined device-related information 70 and communication network-related information 72 to collect and associate with one or more selected event information 34. Additionally, in some aspects, collection configuration 32 may further include parameters and/or instructions that indicate when and where to forward selected event information 34 for analysis, and/or to whom or to what device to provide access to selected event information 34.

Analyzer 48 operates on the selected event information 34, and in some aspects on the selected event-related information 74, according to the logic associated with connection quality state machine 50. Analyzer 48 may be embodied in hardware, software, firmware, data, executable instructions, and combinations thereof. Further, analyzer 48 may further include one or more of any combination of an algorithm, a neural network, a heuristic routine, etc. useful in analyzing selected event information 34, and in some aspects on the selected event-related information 74, and determining connection quality characteristics and/or connection quality metric 52.

Referring to FIGS. 4-15, in one aspect for use with a communication device 22 having a processing engine 38 manufactured by Qualcomm, Incorporated of San Diego, Calif., connection quality state machine 50 determines connection quality characteristics relating to, for example, access failures, access successes, call drops, normal call terminations, new calls and handovers based on states associated with event information. Connection quality state machine 50 makes these determinations for all possible call types available on communication device 22, such as a voice call, a data call and simultaneous voice and data calls. Further state machine 50 is operable to determine mobile originated (MO) calls and mobile terminated (MT) calls, where MO calls are initiated by communication device 22 and MT calls are terminated by communication device 22. Additionally, state machine 50 is operable to determine and track connection quality information for simultaneously-occurring calls, such as simultaneous voice and data calls. Also, state machine 50 is operable to determine connection quality information from the user perspective and/or from the system perspective.

With respect to user perspective and system or network perspective, the plurality of event information 36 comprising processor-generated event codes and corresponding event data enable state machine 50 to differentiate between information associated with OTA messages, and information associated with hardware and/or software states of the communication device that indicate an output that can be perceived by the user of the communication device. For example, predetermined ones of the plurality of event information 36, including by not limited to "CM_SYS_MODE" type event codes, relate to a state of the user interface. For instance, when a user attempts to make a call, the user interface may display an indicator that the call is in the process of connecting, even though a number of connection failures have already occurred and the device is still attempting to connect. In this case, from the user perspective, an access failure has not occurred, but from the network or system perspective, a number of access failures have occurred. Thus, state machine 50 is able to differentiate between these different perspectives by analyzing predetermined ones of the plurality of event information 36 corresponding to the given communication.

Figure 4:
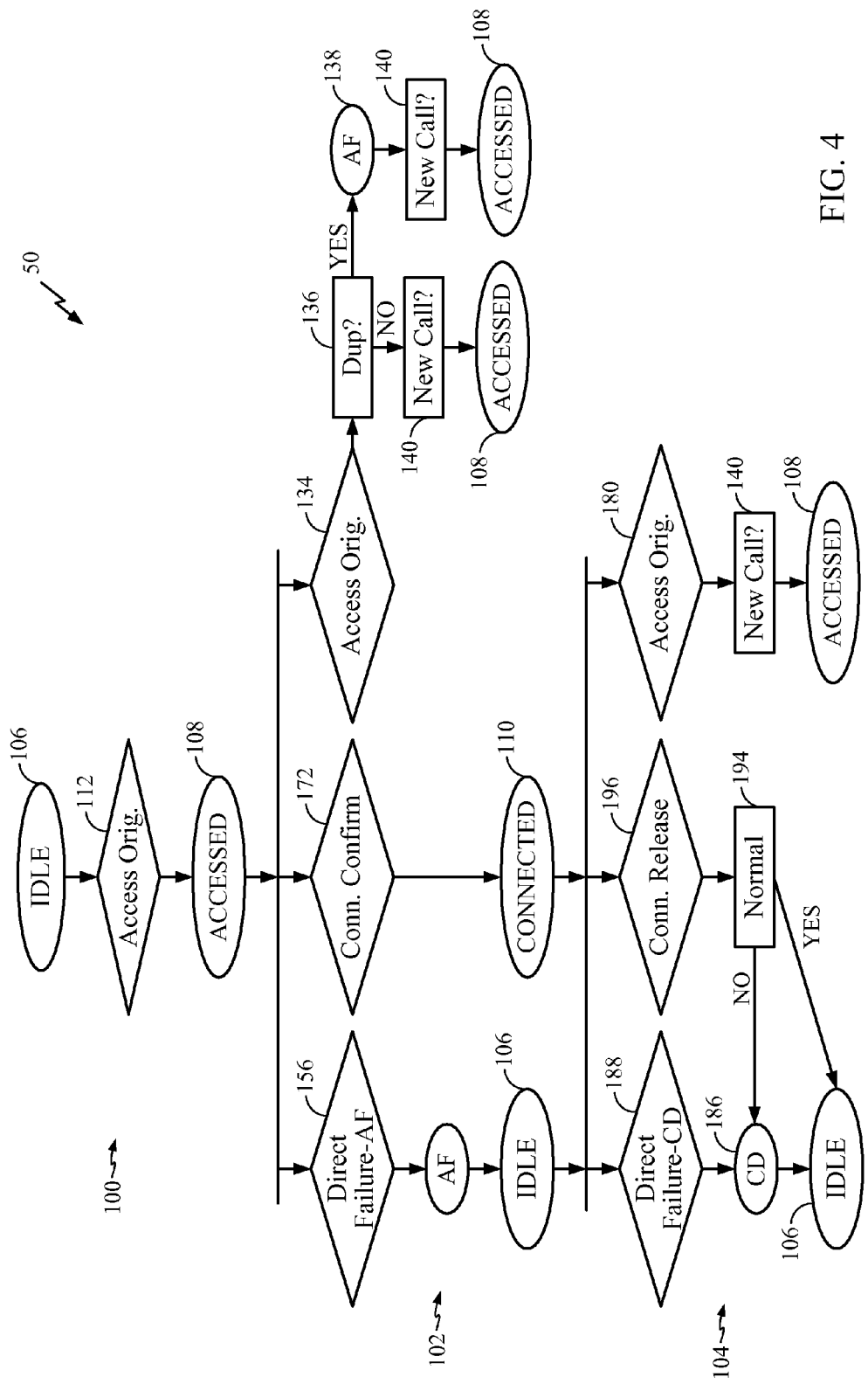
FIG. 4 is a state diagram of an aspect of the connection quality state machine of FIG. 1.

Further, referring to FIG. 4, connection quality state machine 50 is operable to determine call states, and transitions between call states, based on event information. In particular, connection quality state machine 50 identifies connection quality information associated with a first, a second and a third transition 100, 102 and 104, respectively, between an idle state 106, an accessed state 108 and a connected state 110, respectively. In particular, during first transition 100, state machine 50 identifies access attempt-related characteristics. During second transition 102, state machine 50 identifies access success-related characteristics and/or access failure-related characteristics. Further, during third transition 104, state machine identifies normal call termination-related characteristics and call drop-related characteristics. Additionally, during second and third transitions 102 and 104, state machine identifies connection quality information associated with a new call occurring simultaneously with the existing call. FIGS. 5-11 list specific event codes and event data, however, it should be understood that additional and/or equivalent event codes and/or event data may be utilized.

Figure 5:
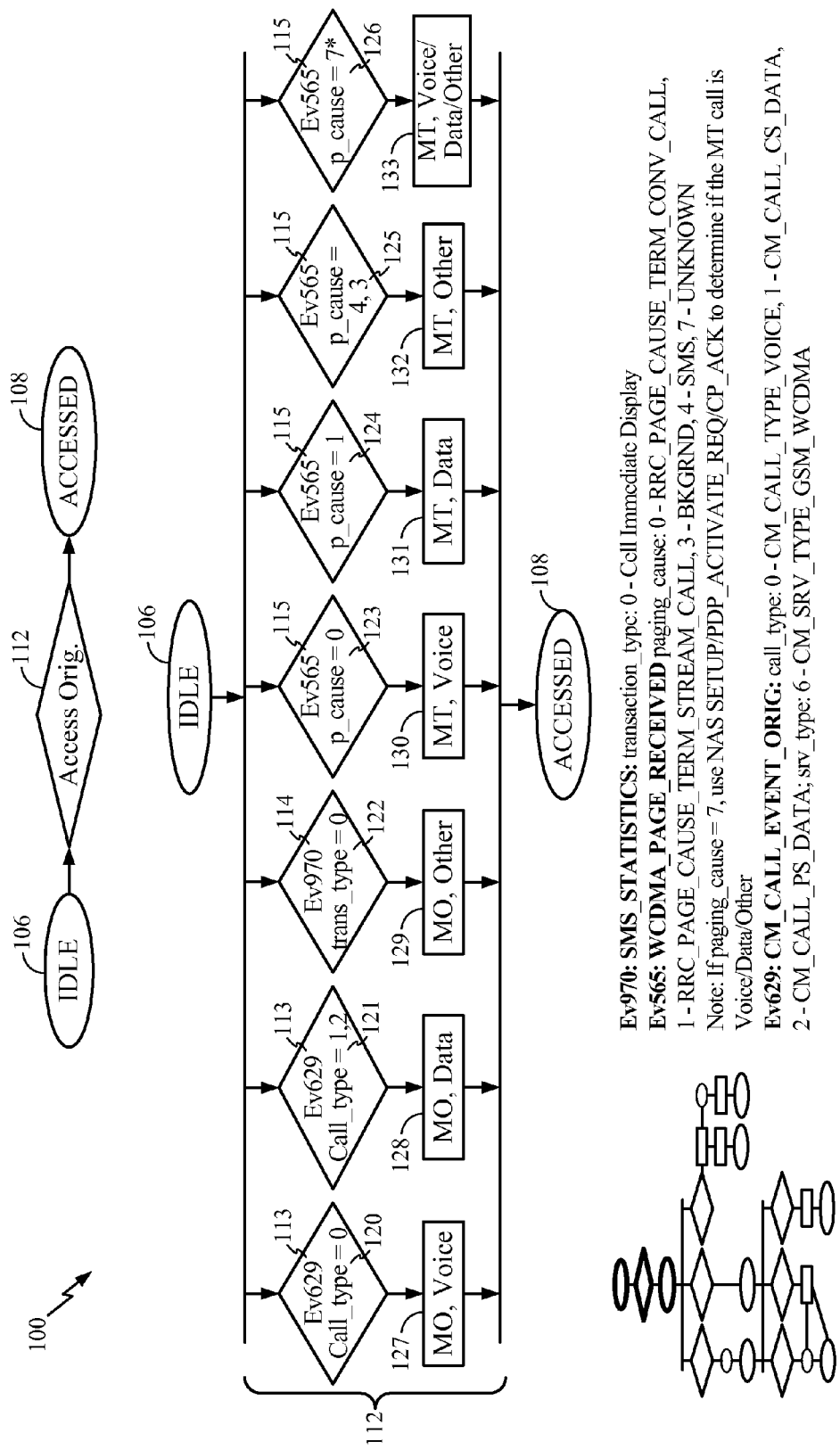
FIG. 5 is a more detailed state diagram of an idle state to accessed state transitional aspect of the connection quality state machine of FIG. 4.

Referring to FIGS. 4 and 5, first transition 100 defines a connection related change between idle state 106 and accessed state 108 based on event information associated with access origination 112. For example, event information representing access origination 112 may comprise predetermined paging messages, predetermined origination messages, etc. exchanged between communication device 22 and communications network 26 and operable to initiate establishment of a call. In particular, referring to FIG. 5, state machine 50 defines one or more event codes and/or one or more associated event data, such as event codes 113-115 and event data 120-126, to determine whether accessed state 108 is achieved, and to determine the call type associated with the attempted access. For example, call types may include call such as mobile originated (MO) voice 127, MO data 128, MO other 129 such as short message service (SMS) or short voice service (SVS), mobile terminated (MT) voice 130, MT data 131, MT other 132 such as SMS or SVS, and MT voice, data or other 133.

Referring to FIG. 4, state machine 50 defines second transition 102 from accessed state 108 according to three different cases.

Figure 6:
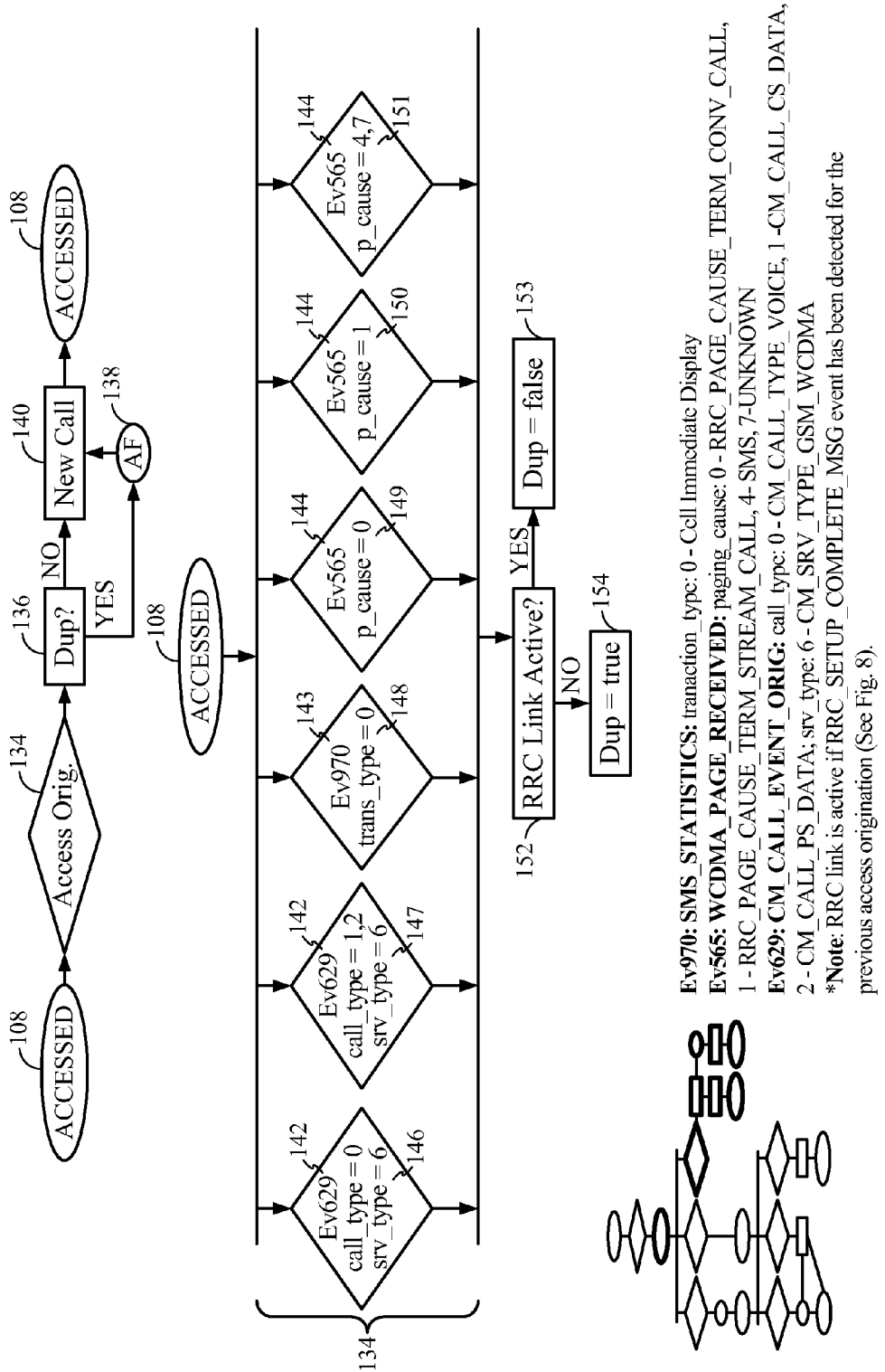
FIG. 6 is a more detailed state diagram of a portion of the connection quality state machine of FIG. 4, the portion for determining, among other things, the occurrence of a concurrent new call during the accessed state.

Referring to FIGS. 4 and 6, in a first case, state machine 50 may determine whether additional event information relating to an additional access origination 134 is duplicate information 136 or a simultaneous new call. For example, event information representing additional access origination 134 may comprise predetermined paging messages, predetermined origination messages, etc. exchanged between communication device 22 and communications network 26. If additional access origination 134 is duplicate information 136, then the original access origination 112 has resulted in an access failure 138 and state machine 50 identifies a new call 140, which replaces the original call in processing toward accessed state 108. If additional access origination 134 is not a duplicate, then state machine 50 identifies new call 140 as a simultaneous voice, data, and/or other call and evaluates the ensuing connection quality characteristics accordingly. In particular, referring to FIG. 6, state machine 50 defines one or more event codes and/or one or more associated event data, such as event codes 142-144 and event data 146-151, to determine access origination-related events in combination with checking the status of the associated radio resource control (RRC) link 152. If the link is active, then a false duplicate 153 is determined and an access failure 138 is recorded. Conversely, if the link is not active, then a true duplicate 154 is determined and new call 140 in the form of a simultaneous new call is recorded and evaluated for further connection quality characteristics.

Figure 7:
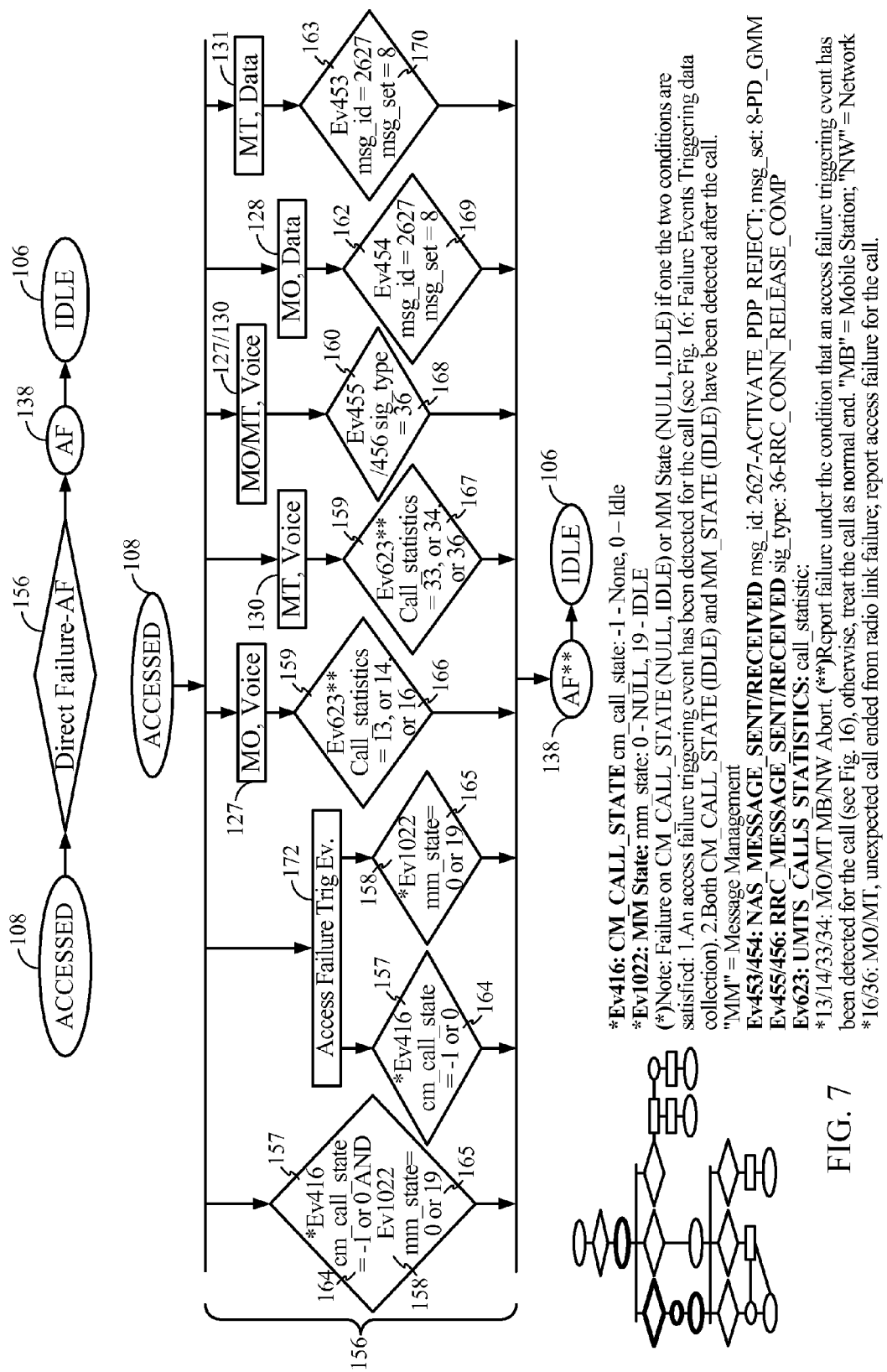
FIG. 7 is a more detailed state diagram of a portion of the connection quality state machine of FIG. 4, the portion for determining an access failure during an accessed state.

Referring to FIGS. 4 and 7, in a second case of second transition 102, state machine 50 may determine whether access failure 138 has occurred based on event information corresponding to a direct failure 156. For example, event information representing direct failure 156 may comprise access failure triggering messages, predetermined release messages, predetermined call state messages, abort messages, etc. exchanged between communication device 22 and communications network 26. In such a case, state machine 50 records access failure 138 in association with the corresponding call, and may further determine whether communication device 22 has returned to idle state 106 based on subsequent event information. In particular, referring to FIG. 7, state machine 50 may define one or more event codes and/or one or more associated event data, such as event codes 157-163 and event data 164-170, to determine access failure 138. Further, state machine 50 may associate a plurality of different event information with an access failure. For example, state machine 50 may associate a predetermined call type, such as the previously identified (see FIG. 5) mobile originated (MO) voice 127, MO data 128, MO other 129, MT voice 130, MT data 131, MT other 132, and MT voice, data or other 133 with a predetermined one or more event codes and/or one or more event data, as illustrated, in order to determine access failure 138. Additionally, independent of call type, state machine 50 may define a predetermined one or more event codes and/or one or more associated event data with access failure 138, such as the combination of event codes 157 and 158 and their respective event data 164 or 165. Further, state machine 50 may define one or more access failure triggering events 172, some examples of which are listed in FIG. 16. If state machine 50 detects one or more of access triggering events 172, which directly indicate an access failure, then state machine 50 may further verify the veracity of the detected access failure triggering event 172 by looking for either event code 157 with event data 164 or event code 158 with event data 165 before determining access failure 138. In one aspect, "cm_call_state" events relate to the state of a call manager portion of processing subsystem 66 (FIG. 2), and occur during a call. In contrast, "mm_state" events indicate the overall state of communication device 22, and occur more frequently than "cm_call_state" events, as "mm_state" events occur during idle states when communication device 22 is not in a call.

Figure 8:
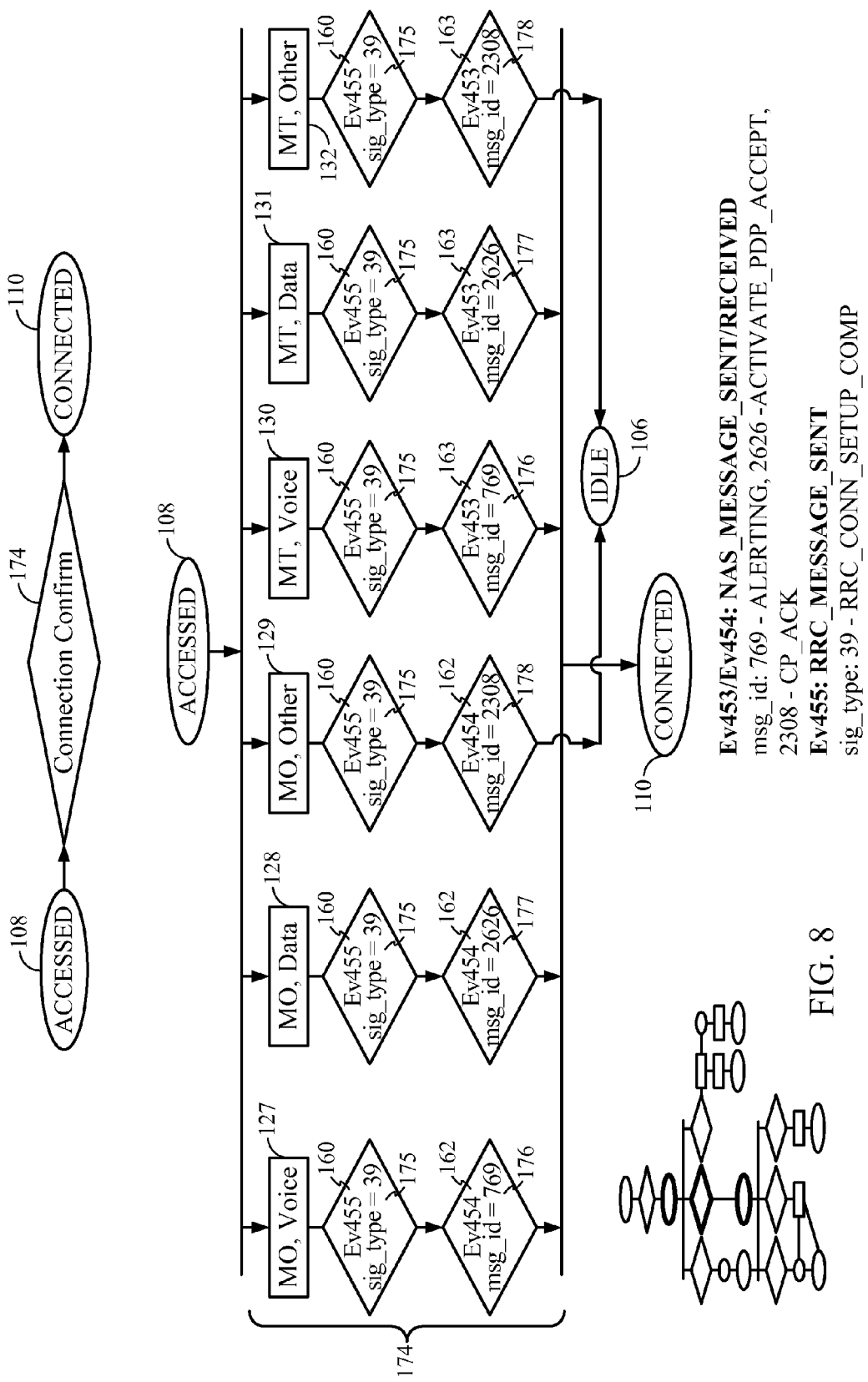
FIG. 8 is a more detailed state diagram of a portion of the connection quality state machine of FIG. 4, the portion for determining a connected call, also referred to as an access success.

Referring to FIGS. 4 and 8, in a third case of second transition 102, state machine 50 may determine whether connected state 110 is achieved based on event information associated with a connection confirmation 174. For example, event information representing connection confirmation 174 may comprise predetermined acknowledgement and/or confirmation messages exchanged between communication device 22 and communications network 26. In this case, in some aspects, for each previously determined call type, such as MO voice 127, MO data 128, MO other 129, MT voice 130, MT data 131 and MT other 132, state machine 50 may define one or more event codes and/or one or more associated event data in order to determine connected state 110. For example, event code 162 and event data 175, in combination with event code 162 and a respective one of event data 176-178 may define connected state 110 for MO voice 127, MO data 128 and MO other 129 call types, respectively. Similarly, for example, event code 160 and event data 175, in combination with event code 163 and a respective one of event data 176-178 may define connected state 110 for MT voice 130, MT data 131 and MO other 132 call types, respectively. Further, in some aspects, for an MO other 129 or MT other 132 call types, such as an SMS and/or SVS call, state machine 50 may define the call state as immediately switching to idle state 106 once the connected state 110 is achieved, as delivery of the text or voice packet immediately concludes the call.

Referring to FIG. 4, state machine 50 defines third transition 104 which follows from connected state 110, and which may follow three cases which determine whether a normal call termination or a call drop occurs, or if a simultaneous new call occurs, respectively.

Figure 9:
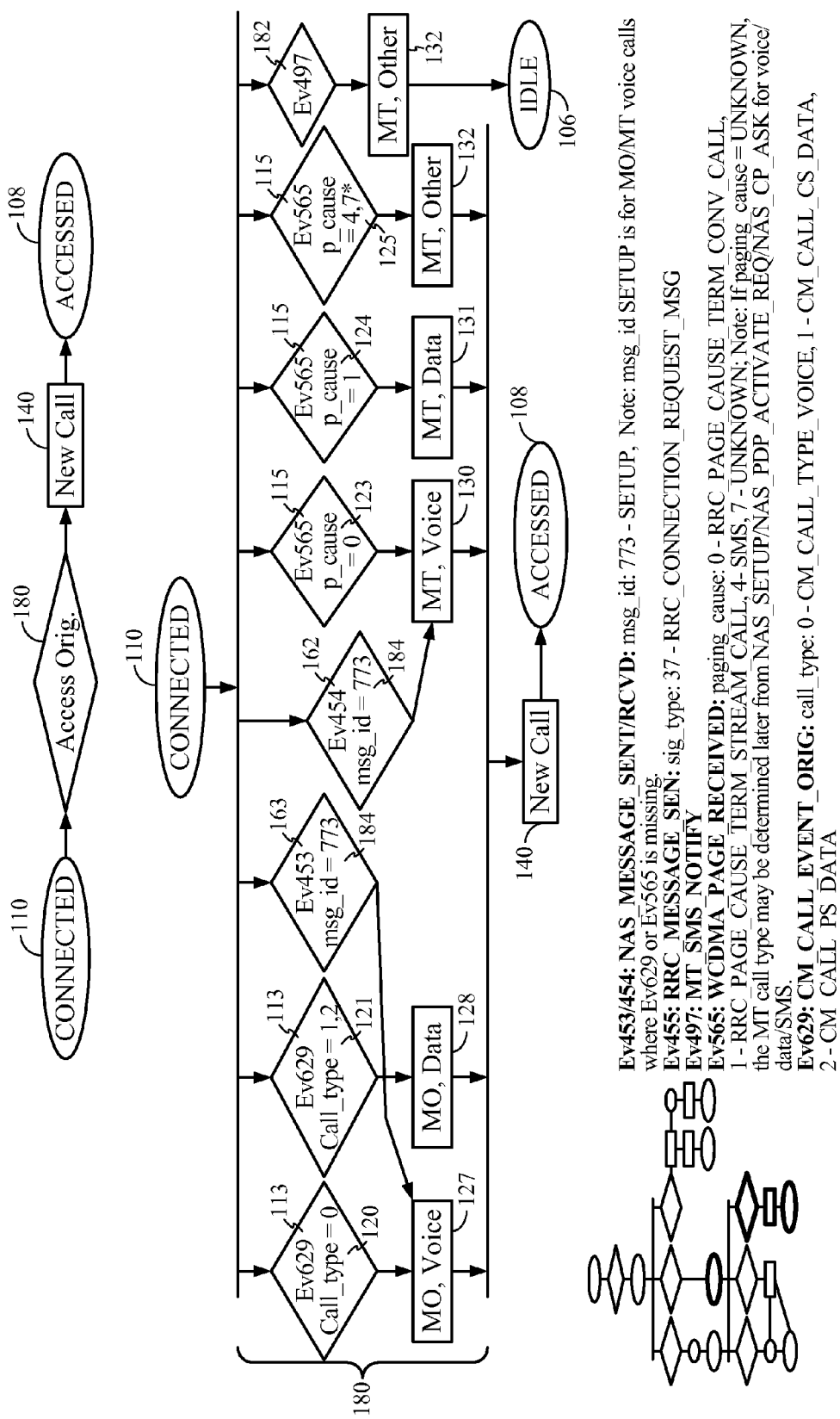
FIG. 9 is a more detailed state diagram of a portion of the connection quality state machine of FIG. 4, the portion for determining, among other things, the occurrence of a concurrent new call during the connected state.

Referring to FIGS. 4 and 9, in a first case which determines if a simultaneous new call occurs, state machine 50 analyzes additional event information corresponding to additional access origination 180 occurring while communication device 22 is in connected state 110. For example, event information representing additional access origination 180 may comprise predetermined paging messages, predetermined origination messages, etc. exchanged between communication device 22 and communications network 26. In particular, referring to FIG. 9, for calls having a first predetermined event code 113, state machine 50 determines mobile originated call types such as MO voice 127 based on predetermined event data 120 and MO data 128 based on predetermined event data 121. Similarly, for calls having predetermined event code 115, state machine 50 determines mobile terminated call types such as MT voice 130 based on predetermined event data 123, MT data 131 based on predetermined event data 124 and MT other 132 based on predetermined event data 125. Further, in a case where state machine 50 determines that a call is mobile originated, but predetermined event code 113 is missing, then state machine 50 may look to predetermined event code 163 to determine MO voice 127 and predetermined event code 162 to determined MO data 128, where both codes 162 and 163 include event data 184 indicating a call set up. In each of the above instances, the detected call type may be determined to be new call 140 occurring simultaneously with the existing call, and state machine 50 may according determine the subsequent connection quality characteristics associated with new call 140. Additionally, state machine 50 may determine MT other 132 calls based on predetermined event code 182 associated with an SMS notification message, which may immediately transition into idle state 106.

Figure 10:
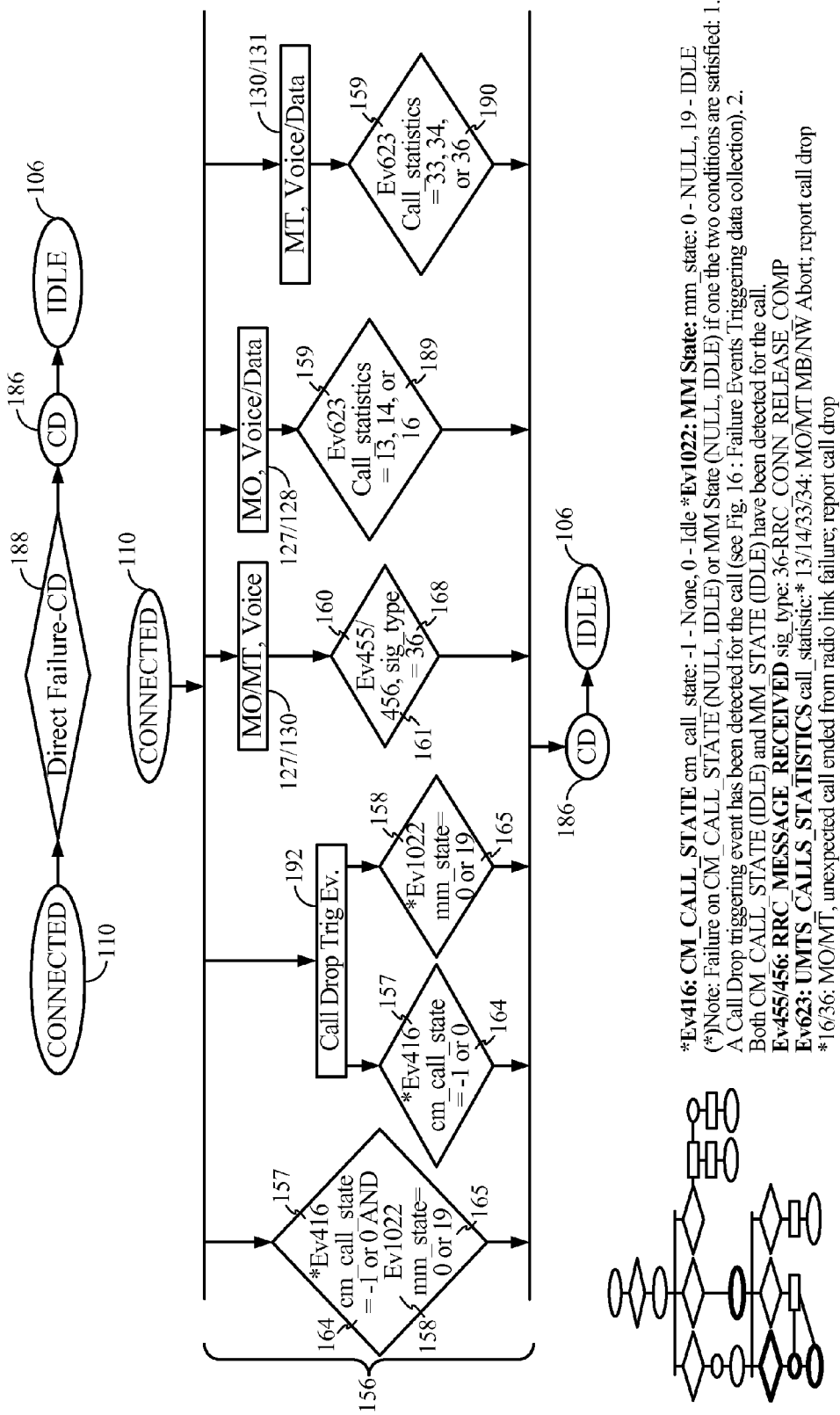
FIG. 10 is a more detailed state diagram of a portion of the connection quality state machine of FIG. 4, the portion for determining a call drop after achieving the connected state.

Referring to FIGS. 4 and 10, in a second case which determines if a call drop 186 occurs, state machine 50 analyzes event information corresponding to a direct failure 188 occurring while communication device 22 is in connected state 110. For example, event information relating to direct failure 188 may include release messages, abort messages, and messages directly indicating a call drop. In particular, referring to FIG. 10, state machine 50 may define a connected call followed by a combination of predetermined events, such as event code 157 with event data 164 in combination with event code 158 with event data 165, which may indicate that the current state is now an idle state 106, as being call drop 186. Further, state machine 50 may define certain events as direct call drop triggering events 192, some examples of which are listed in FIG. 16. In order to verify the veracity of a detected call drop triggering event 192, state machine 50 may additionally check for either event code 157 with event data 164 or event code 158 with event data 165, which verify that the call is no longer connected. Further, state machine 50 may associate predetermined event codes 160 or 161, each having predetermined event data 168, which may be associated with a release message indicating that a release is completed, with call drop 186 for respective MO voice 127 and MT voice 130 call types. Additionally, state machine 50 may associate predetermined event code 159 having predetermined event data 189, which may be associated with abort messages, with call drop 186 for respective MO voice 127 and MO data 128 call types. Similarly, state machine 50 may associate predetermined event code 159 having predetermined event data 190, which may be associated with call end messages, with call drop 186 for respective MT voice 130 and MT data 131 call types.

Figure 11:
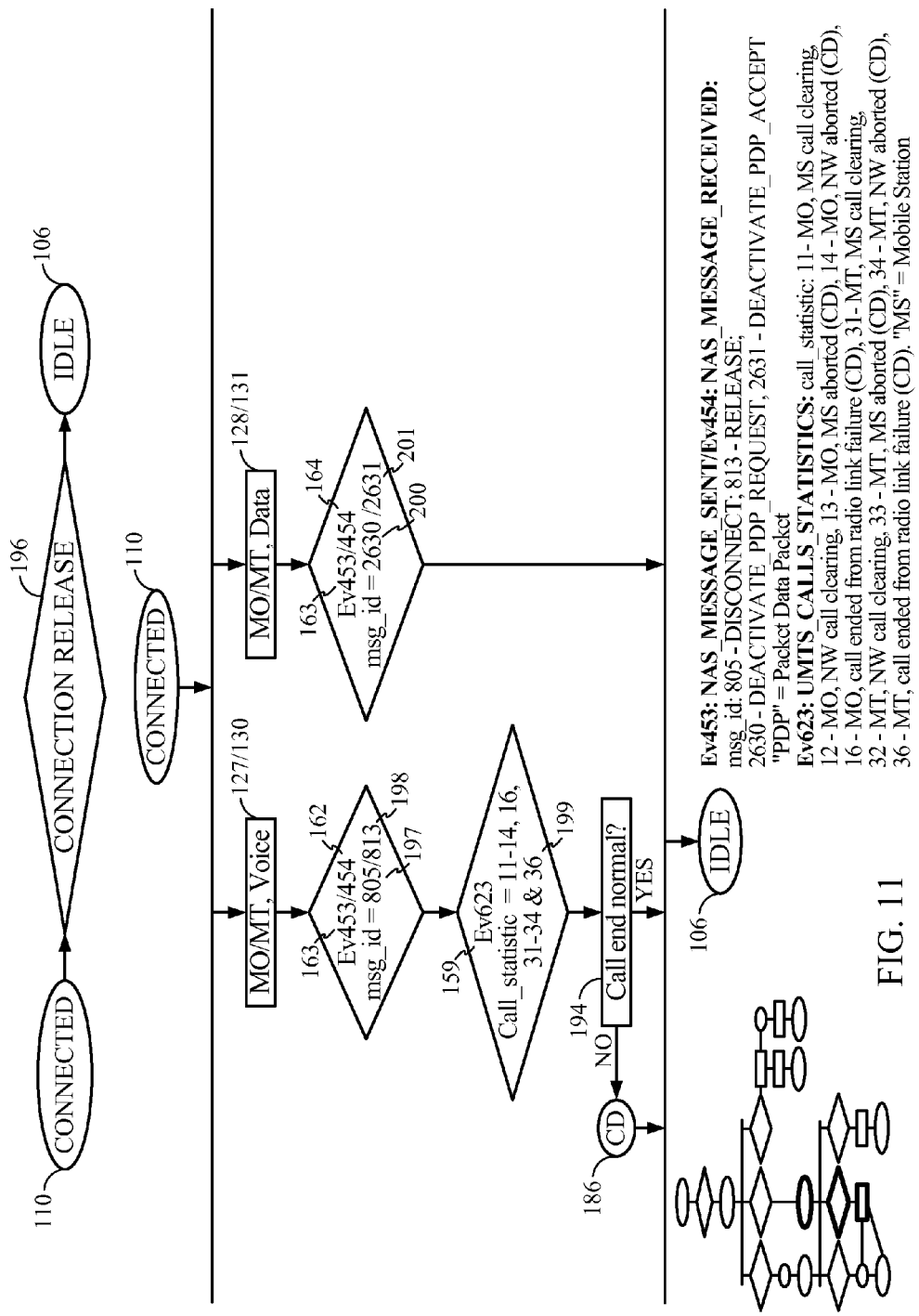
FIG. 11 is a more detailed state diagram of a portion of the connection quality state machine of FIG. 4, the portion for determining, among other things, a normal call termination after achieving the connected state.
Figures 12, 13, 14, 15:
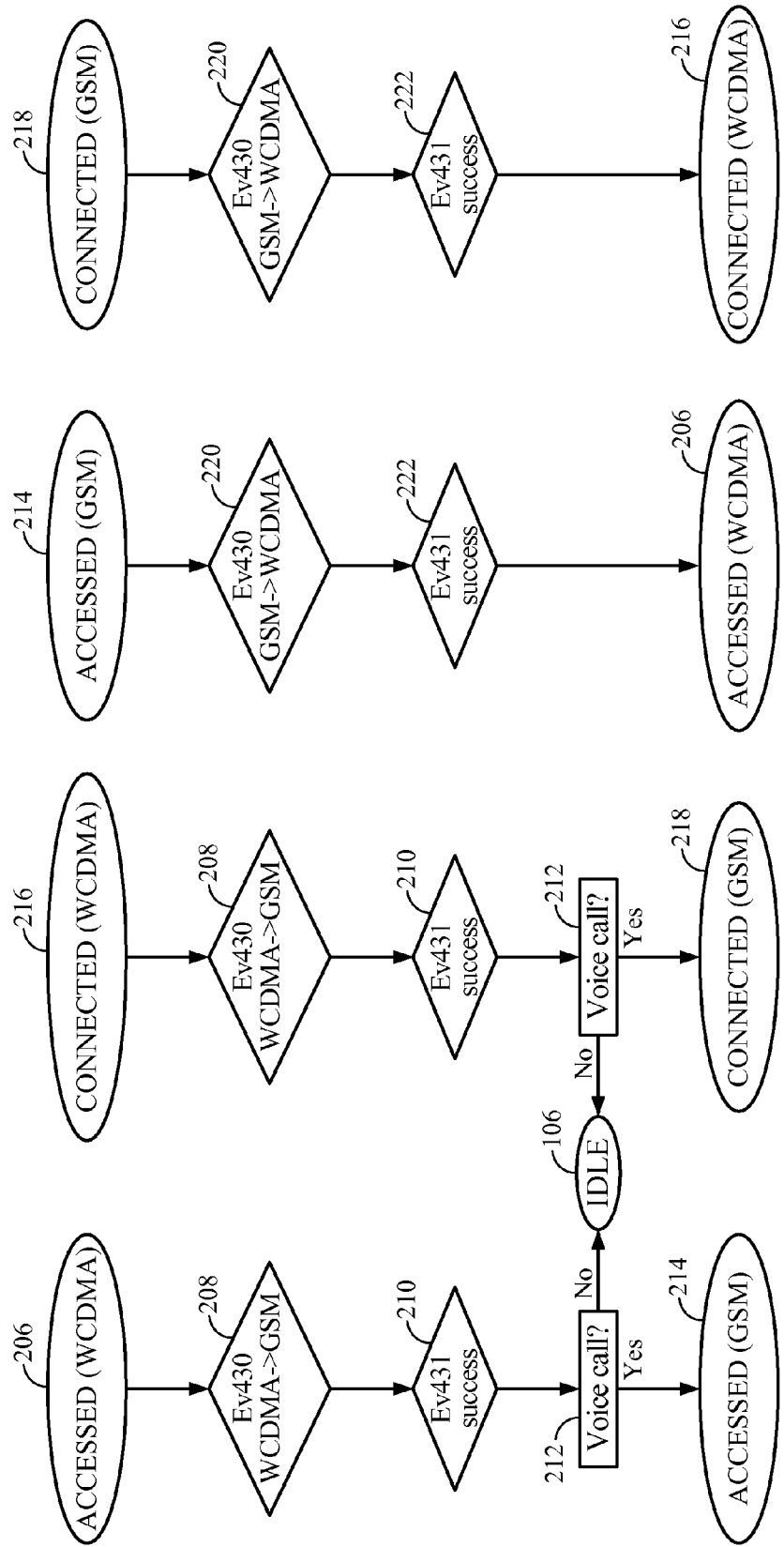
FIG. 12 is a state diagram of a portion of the connection quality state machine of FIG. 4, the portion for determining whether to maintain an accessed state during a handover from a WCDMA system to a GSM system.
FIG. 13 is a state diagram of a portion of the connection quality state machine of FIG. 4, the portion for determining whether to maintain a connected state during a handover from a WCDMA system to a GSM system.
FIG. 14 is a state diagram of a portion of the connection quality state machine of FIG. 4, the portion for determining whether to maintain an accessed state during a handover from a GSM system to a WCDMA system.
FIG. 15 is a state diagram of a portion of the connection quality state machine of FIG. 4, the portion for determining whether to maintain a connected state during a handover from a GSM system to a WCDMA system.

Referring to FIGS. 4 and 11, in a third case which determines if a call drop 186 occurs or a normal call termination 194 occurs, state machine 50 analyzes event information corresponding to a connection release 196 occurring while communication device 22 is in connected state 110. For example, event information relating to connection release 196 may include release messages, disconnect messages, abort messages, call clearing messages, call ended messages, deactivation messages, etc. In particular, referring to FIG. 11, state machine 50 may already know the call type, such as MO voice 127 or MT voice 130 call types based on a combination of event codes and event data, such as event code 163 or 164 with event data 197 or 198 in combination with event code 159 with event data 199. Subsequently, state machine 50 may determine call drop 186 or normal call termination 194 based on whether or not the call ended normally, and may further detect a subsequent transition back to idle state 106. Further, state machine 50 may determine MO data 128 or MT data 131 call types based on predetermined event codes and event data, such as event code 163 with event data 200 or event code 164 with event data 201, which respectively indicate that the data message was sent or received.

Additionally, referring to FIGS. 12-15, in some aspects state machine 50 is operable to maintain call state information across handovers by transferring the current state of the existing radio access technology to the new radio access technology. In this case, state machine 50 may include a plurality of state machines each configured for operation based on one of a plurality of radio access technologies. So, when a handover occurs, the corresponding one of the plurality of state machines operates to determine connection quality characteristics specific to the corresponding radio access technology. As such, state machine 50 is operable to store the current call state across radio access technologies to enable the correct determination of connection quality characteristics for the radio access technology receiving the communication in the handover. For example, referring to FIG. 12, in handover from a WCDMA system to a GSM system, state machine 50 transfers the accessed state 206 in WCDMA to an accessed state 214 in GSM based on identifying a handover request event 208 and a handover success event 210 in combination with determining that the call type is a voice call 212. Similarly, referring to FIG. 13, in handover from a WCDMA system to a GSM system, state machine 50 transfers the connected state 216 in WCDMA to a connected state 218 in GSM based on identifying handover request event 208 and handover success event 210 in combination with determining that the call type is a voice call 212. In both FIGS. 12 and 13, in some optional aspects, if state machine 50 determines that the call type is not a voice call, then state machine 50 changes the call state to an idle state 106 as in some technologies only voice calls may be involved in a handover. It should be noted, however, that this check may not be required, or checks for other types of call types may be utilized depending on the call types supported during handover by the given communication system. Conversely to FIG. 12, referring to FIG. 14, in handover from a GSM system to a WCDMA system, state machine 50 transfers the accessed state 2146 in GSM to accessed state 206 in WCDMA based on identifying a handover request event 220 and a handover success event 222. Similarly, referring to FIG. 15, which is the reverse of the scenario of FIG. 13, in handover from a GSM system to a WCDMA system, state machine 50 transfers the connected state 218 in GSM to the connected state 216 in WCDMA based on identifying handover request event 220 and handover success event 222. It should be noted that in FIGS. 14 and 15, the call type is not checked, however, a call type check could be added depending on the call types supported during handover by the given communication system.

Referring to FIGS. 16-22, in one aspect of system 20 comprising communications device 22 having processing engine 38 utilizing all mode system software (AMSS) produced by Qualcomm, Incorporated of San Diego, Calif., examples of the plurality of event information 36 are listed. Although FIGS. 16-22 list event code identifiers and names associated with the AMSS of Qualcomm, Incorporated, it should be understood that other additional and/or equivalent event identifiers and names generated by other types of processing engines are also included.

For example, referring to FIG. 16 predetermined event information 230 may be collected in connection quality log 40 (FIG. 1) as selected event information 34 (FIG. 1) upon every occurrence of the respective event. Similarly, predetermined event information 232 may correspond to direct failure events which automatically trigger data collection, as discussed with respect to access failure triggering events 138 in FIG. 7 and with respect to call drop triggering events 186 in FIG. 10. It should be noted that the direct failure events listed in FIG. 16 are merely examples of direct failure triggering events, and that additional and/or equivalent events may also be utilized which provide a direct indication of a connection quality failure.

Further, for example, referring to FIG. 17, call manager call state event information 234 and call manager call event origination event information 236 may also be utilized. The term "call manager" refers to an aspect of processing subsystem 66 (FIG. 2) which handles the initiation and maintenance of calls, based on predetermined settings, for communications device 22 (FIG. 2).

Additionally, for example, referring to FIG. 18, GSM handover-related event information 238 and 240, as well as WCDMA handover-related event information 242, and multimedia state event information 244 may also be utilized by state machine 50 (FIG. 1) in determining connection quality characteristics or metrics.

Further, for example, referring to FIG. 19, various network access signaling (NAS) event information 246 and 248, as well as various radio resource control (RRC) event information 250 and 252 may also be utilized by state machine 50 (FIG. 1) in determining connection quality characteristics or metrics.

Additionally, for example, referring to FIG. 20, various short message service (SMS)-related event information 254 and 256, as well as various paging event information 258, such as WCDMA protocol-based paging events, may also be utilized by state machine 50 (FIG. 1) in determining connection quality characteristics or metrics.

Further, for example, referring to FIG. 21, various UMTS call statistic-related event information 260 may also be utilized by state machine 50 (FIG. 1) in determining connection quality characteristics or metrics.

Figure 22:

Additionally, for example, referring to FIG. 22, various call manager (CM) data suspend (DS) inter-radio access technology (RAT) handover event information 262 may also be utilized by state machine 50 (FIG. 1) in determining connection quality characteristics or metrics.

The present system 20, including state machine 50, may be operable to determine connection quality characteristics or metrics in any use case experienced by communication device 22 including, but not limited to, use cases such as: MO voice call; MO data call, such as web surfing; MO SMS/email calls; MO voice call with an at least partially concurrent new voice call and an at least partially concurrent new MT SMS call; MO data call with an at least partially concurrent new MT voice call and an at least partially concurrent new MT SMS call; MO call resulting in an access failure occurring while the communication device is in the power on mode; MT SMS call; MT voice call; MT voice call with an at least partially concurrent MO data call, such as surfing the web; MO data call with an at least partially concurrent new MT voice call including a handover to GSM; MO voice call resulting in either an access failure or a call drop; MT voice call resulting in either an access failure or a call drop; multiple, at least partially concurrent MO and/or MT voice calls resulting in either an access failure or a call drop; MO data call resulting in an access failure; consecutive MO and/or MT voice and/or data calls; MT data call; multiple, at least partially concurrent voice calls including handovers to GSM; calls including transitions from an accessed state to an accessed state during a handover; MT calls with cause types: RRC_PAGE_CAUSE_TERM_INTERACT_CALL, RRC_PAGE_CAUSE_HIGH_PRI_SIGNALLING and RRC_PAGE_CAUSE_LOW_PRI_SIGNALLING; MO calls with cause types: CM_CALL_TYPE_PD, CM_CALL_TYPE_TEST, CM_CALL_TYPE_OTAPA, CM_CALL_TYPE_STD_OTASP, CM_CALL_TYPE_NON_STD_OTASP Further, in one aspect of system 20 comprising communications device 22 having processing engine 38 utilizing all mode system software (AMSS) produced by Qualcomm, Incorporated of San Diego, Calif., the plurality of event information 36, and thus the selected event information 34, may include an event code and event data. The event code may comprise a unique identifier associated with the respective processor-generated event, such as a log code or a pseudo log code. The event data may comprise one or any combination of a name of the event and parameters defining the characteristics of the event, such as cause names and/or cause codes and call type names and/or call type codes.

For example, referring to FIG. 23, event information corresponding to a UMTS call drop event 266 may comprise a log code 268, a cause code 270 which may include at least one of a plurality of values representing a different cause for the call drop, and a call type index code 272 which may include at least one of a plurality of call types.

Further, for example, referring to FIG. 24, event information corresponding to a UMTS access failure event 274 may comprise a log code 276, a cause code 278 which may include at least one of a plurality of values representing a different cause for the access failure, and a call type index code 280 which may include at least one of a plurality of call types.

Additionally, for example, referring to FIG. 25, event information corresponding to a UMTS call connect event 282 may comprise a log code 284, a cause code 286 which may include at least one of a plurality of values representing a different cause for the call connect, and a call type index code 288 which may include at least one of a plurality of call types. Similarly, for example, event information corresponding to a UMTS access attempt event 290 may comprise a log code 292, a cause code 294 which may include at least one of a plurality of values representing a different cause for the access attempt, and a call type index code 296 which may include at least one of a plurality of call types.

Further, for example, referring to FIG. 26, event information corresponding to an in service (INS) event 298 may comprise a log code 300, a cause code 302 which may include at least one of a plurality of values representing a different cause for the in service event, such as service with a given system, and, optionally, a call type index code 304 which may include at least one of a plurality of call types. Similarly, for example, event information corresponding to an out of service (OOS) event 306 may comprise a log code 308, a cause code 310 which may include at least one of a plurality of values representing a different cause for the out of service event, and, optionally, a call type index code 312 which may include at least one of a plurality of call types.

State machine 50 (FIG. 1) may count the number of INS events and OOS events experienced by a respective communication device 22 (FIG. 1).

Additionally, state machine 50 (FIG. 1) may compute a setup time for each call based on a difference between are recorded time at which the call is connected and the recorded time at which the call access is detected.

Referring back to FIG. 1, communications network 26 may comprise any data and/or voice communications network. For example, communications network 26 may comprise all or some portion of any one or any combination of: a wired or wireless telephone network; a terrestrial telephone network; a satellite telephone network; an infrared network such as an Infrared Data Association (IrDA)-based network; a short-range wireless network; a Bluetooth® technology network; a ZigBee® protocol network; an ultra wide band (UWB) protocol network; a home radio frequency (HomeRF) network; a shared wireless access protocol (SWAP) network; a wideband network, such as a wireless Ethernet compatibility alliance (WECA) network, a wireless fidelity alliance (Wi-Fi Alliance) network, and a 802.11 network; a public switched telephone network; a public heterogeneous communications network, such as the Internet; a private communications network; a multicast network such as a Forward Link Only (FLO) network, including the MediaFLO™ System available from Qualcomm, Inc. of San Diego, Calif.; a digital video broadcasting (DVB) network, such as DVB-S for satellite, DVB-C for cable, DVB-T for terrestrial television, DVB-H for terrestrial television for handhelds; and a land mobile radio network.

Further, examples of telephone networks that may be included in some aspects of communications network 26 include at least a portion of one, or any combination, of analog and digital networks/technologies, such as: code division multiple access (CDMA), wideband code division multiple access (WCDMA), universal mobile telecommunications system (UMTS), advanced mobile phone service (AMPS), time division multiple access (TDMA), frequency division multiple access (FDMA), orthogonal frequency division multiple access (OFDMA), global system for mobile communications (GSM), single carrier (1×) radio transmission technology (RTT), evolution data only (EV-DO) technology, general packet radio service (GPRS), enhanced data GSM environment (EDGE), high speed downlink data packet access (HSPDA), analog and digital satellite systems, and any other technologies/protocols that may be used in at least one of a wireless communications network and a data communications network.

Figure 27:
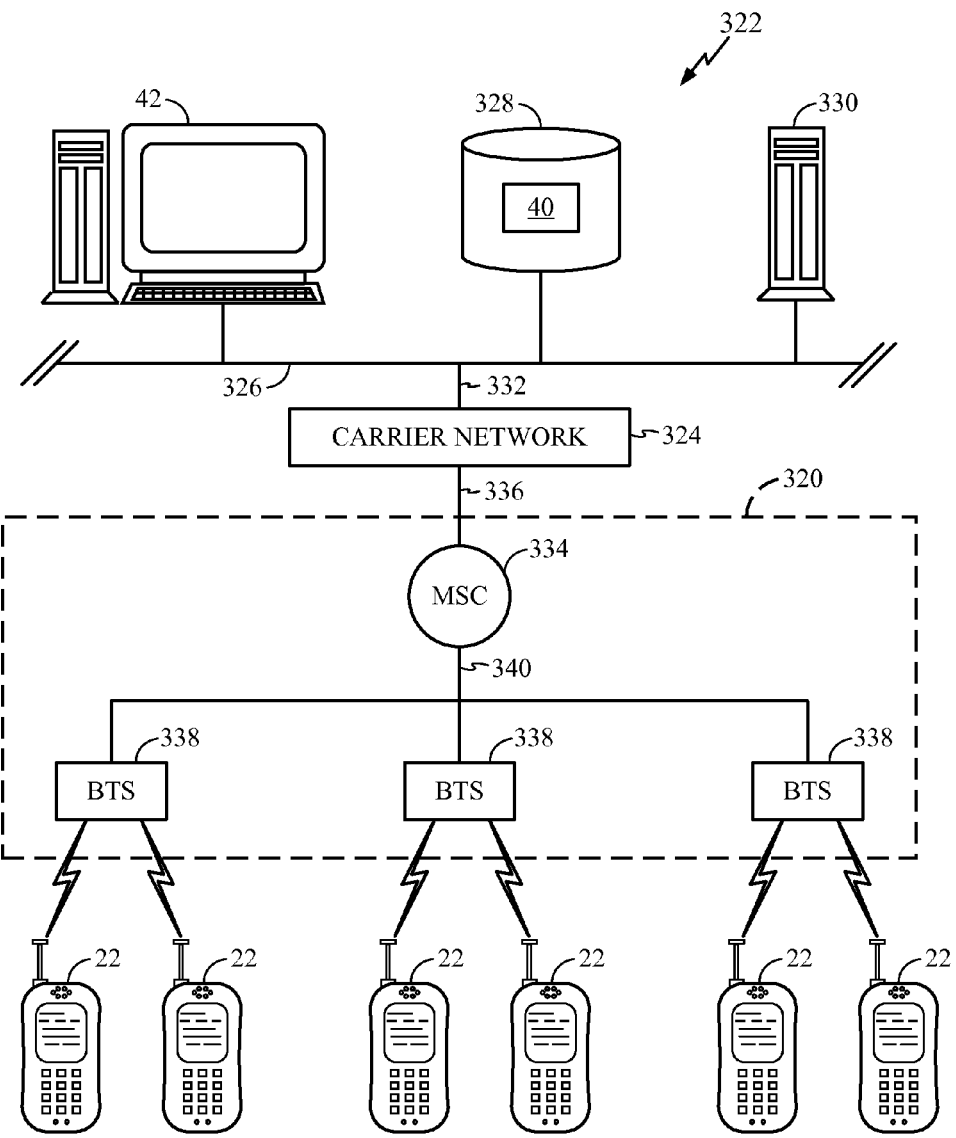
FIG. 27 is a schematic diagram of functional components of one aspect of a cellular telephone implementation of connection quality determination system 20 of FIG. 1.

Referring to FIG. 27, in an example of a cellular telephone aspect, system 20 (FIG. 1) may include wireless network 320 connected to a wired network 322 via a carrier network 324. FIG. 2 is a representative diagram that more fully illustrates the components of a cellular wireless network and interrelation of the elements of one embodiment of the present system. Cellular wireless network 320 is merely exemplary and can include any system whereby remote modules, such as wireless devices 22, communicate over-the-air between and among each other and/or between and among components of a wireless network 320, including, without limitation, wireless network carriers and/or servers.

In system 320, network device or user manager server 42 can be in communication over a LAN network 326 with a separate data repository 328 for storing the data gathered from the remote wireless devices 22, such as the respective connection quality logs 40. Further, a data management server 330 may be in communication with user manager 42 to provide post-processing capabilities, data flow control, etc. User manager 42, and/or data management server 330, may communicate with carrier network 324 through a data link 332, such as the Internet, a secure LAN, WAN, or other network. Carrier network 324 controls messages (generally being data packets) sent to a mobile switching center ("MSC") 334. Further, carrier network 324 communicates with MSC 334 by a network 336, such as the Internet, and/or POTS ("plain old telephone service"). Typically, in network 336, a network or Internet portion transfers data, and the POTS portion transfers voice information. MSC 334 may be connected to multiple base stations ("BTS") 338 by another network 340, such as a data network and/or Internet portion for data transfer and a POTS portion for voice information. BTS 338 ultimately broadcasts messages wirelessly to the wireless devices, such as cellular telephones 22, by short messaging service ("SMS"), or other over-the-air methods.

Figure 28:
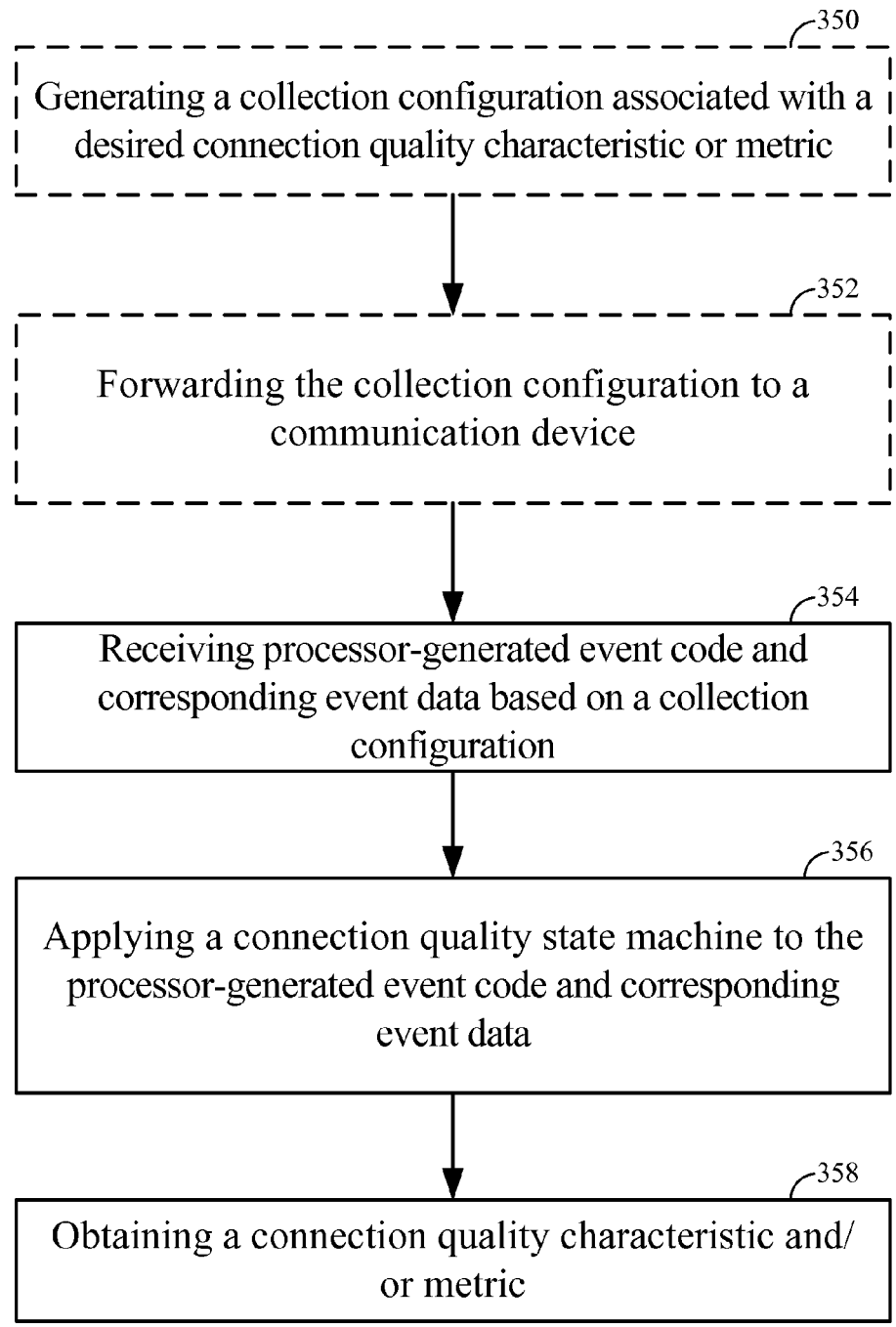
FIG. 28 is flowchart of an aspect of a method for determining connection quality of a communication between a communication device and a communication network.

In operation, referring to FIG. 28, in one aspect, a method for determining at a network device a connection quality between a communication device and a communications network may optionally comprise generating a collection configuration associated with a desired connection quality characteristic or metric to track (Block 350). For example, in one aspect, referring to FIG. 3, network device 42 may execute connection quality configuration generator 94 to generate collection configuration 32. Collection configuration 32 may be configured to cause a communication device to collection selected event information 34 (FIG. 2) generated by processing engine 38 (FIG. 2) of communication device 22, and/or selected event-related information 74 (FIG. 2), and corresponding to one or more desired connection quality characteristics or metrics 52, such as an occurrence, number and/or rate of an access failure, a call drop and/or an out of service event experienced by communication device 22.

Further, the method may optionally comprise forwarding the collection configuration to one or more communication devices (Block 352). For example, referring to FIGS. 1 and 2, in one aspect, network device 42 may forward collection configuration 32 to communication device 22. It should be noted that collection configuration 32 may be sent to any plurality of communication devices, such as all devices associated with a given carrier network, all devices of a given make and/or model, all devices within a given network or geographic region, and any other group of one or more communication devices for which it may be desirable to determine one or more connection quality characteristics.

Additionally, the method comprises receiving a processor-generated event code and corresponding processor-generated event data based on execution of the collection configuration by the respective communication device (Block 354). For example, in one aspect, network device 42 (FIG. 3) may receive one or more selected event information 34, which may be stored within a connection quality log 40. Optionally, network device 42 may further receive one or more selected event-related information 74 based on execution of collection configuration 32. Event information may comprise the processor-generate event code and the corresponding event data. Further, event information may be generated based upon or in representation of all and/or some portion of one or more over-the-air messages and/or data packets associated with a given communication protocol utilized by communication device 22 and communications network 26.

Further, the method comprises applying a connection quality state machine to the processor-generated event code and corresponding processor-generated event data (Block 356) and obtaining a connection quality characteristic and/or metric (Block 358). For example, in one aspect, network device 42 may execute analyzer 48 to apply connection quality state machine 50 to selected event information 34. Connection quality state machine 50 may then be operable to determine connection quality characteristics, such as access failures, call drops, out of service events, and analyzer 48 and/or state machine 50 may calculate and store connection quality metrics 52 based thereon. For example, such metrics 52 may be utilized by a network carrier, a communication device and/or communication device component manufacturer, a marketer, etc. in order to identify and/or correct and/or optimize connection quality of the communication network and/or the communication device.

Figure 29:
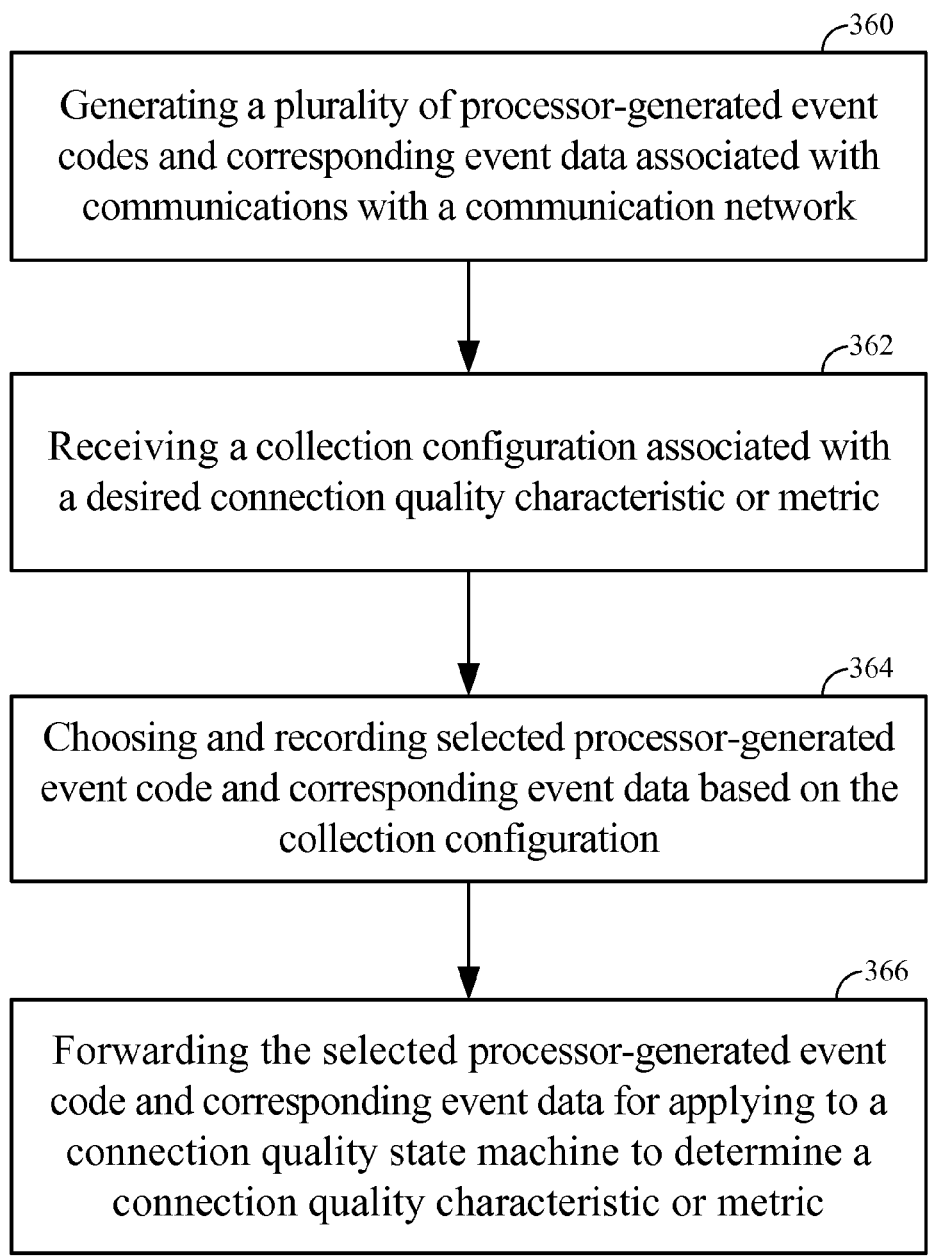
FIG. 29 is a flowchart of an aspect of a method of gathering connection quality-related information associated with a communication between a communication device and a communication network.

Referring to FIG. 29, in another aspect, a method operable by a communication device for gathering information to determine a connection quality between a communication device and a communications network may comprise generating a plurality of processor-generated event codes and corresponding event data associated with communications between the communication device and a communications network (Block 360). For example, in one aspect, referring to FIG. 1, communication device 22 may generate the plurality of event information 36 based on communications 24.

The method may further comprise receiving a collection configuration associated with a desired connection quality characteristic and/or metric (Block 362). For example, in one aspect, referring to FIG. 1, communication device 22 may receive collection configuration 32.

Additionally, the method may comprise choosing and recording selected processor-generated event codes and corresponding event data based on the collection configuration (Block 364). For example, in one aspect, referring to FIG. 1, communication device 22 may execute connection quality module 30 based on collection configuration 32 and collect selected event information 34.

Further, the method may comprise forwarding the selected processor-generated event code and corresponding event data for application to a connection quality state machine for determination of a connection quality characteristic or metric associated with the communication between the communication device and the communication network (Block 366). For example, in one aspect, referring to FIG. 1, communication device 22 may forward selected event information 34 to network device 42 for analysis by analyzer 48 executing connection quality state machine 50 to generate one or more connection quality characteristics, such as an access failure, a call drop or an out of service event, and/or one or more connection quality metrics 52 corresponding to communication 24 between communication device 22 and communication network 26.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps and/or actions of a method or algorithm described in connection with the aspects disclosed herein may be embodied directly in hardware, in a software module executed by a processor, or in a combination of the two. Further, the methods and/or actions described herein may be performed by one or more modules of at least one processor, wherein each of the one or more modules may correspond to respective ones of the method steps and/or actions. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may be defined by a computer program product comprising one or any combination or set of instructions or codes on a machine-readable medium and/or a computer readable medium wherein each of the one or more sets of instructions or codes may correspond to respective ones of the method steps and/or actions.

While the foregoing disclosure shows illustrative aspects and/or embodiments, it should be noted that various changes and modifications could be made herein without departing from the scope of the described aspects and/or embodiments as defined by the appended claims. Furthermore, although elements of the described embodiments may be described or claimed in the singular, the plural is contemplated unless explicitly stated. Additionally, all or a portion of any aspect and/or embodiment may be utilized with all or a portion of any other aspect and/or embodiment, unless stated otherwise.

What is claimed is:

1. A method of determining a connection quality between a communication device and a communications network, comprising:
receiving from the communication device at least one of communication device processor-generated event code and corresponding communication device processor-generated event data based on execution of a connection quality configuration by the communication device, wherein the processor-generated event code and the processor-generated event data correspond to connection quality aspects of a communication between the communication device and the communications network, wherein the processor-generated event code and the processor-generated event data are based on state information of at least a portion of one or more hardware or software components of the communication device, wherein the state information includes user interface connection information as perceived by a user of the communication device and actual connection information based on transpired communications between the communication device and the communications network, wherein the user interface connection information is different from the actual connection information;
generating a connection quality characteristic associated with the communication according to analysis of at least one of the processor-generated event code and the processor-generated event data by a connection quality state machine;
wherein the connection quality characteristic relates to one of an access failure, a call drop, or an out of service event;
wherein generating the connection quality characteristic further comprises generating a communication device user-perceived connection quality characteristic, wherein the communication device user-perceived connection quality characteristic is different from a network-perceived connection quality characteristic;
storing the generated connection quality characteristic corresponding to the communication; and
generating a connection quality metric based on a plurality of the connection quality characteristics, the connection quality metric comprising a number of network-perceived call attempts, a number of user-perceived call attempts, and at least one of a number of access failures, call drops, or out of service states, wherein the number of network-perceived call attempts for at least one user-initiated call is different from the number of user-perceived call attempts for the at least one user-initiated call.

2. The method of claim 1, further comprising:
determining and storing, in association with the connection quality characteristic, a transition by the communication device between at least two of an idle state, an access state and a connected state, based on the processor-generated event code and corresponding processor-generated event data; and
determining and storing a call type associated with the connection quality characteristic.

3. The method of claim 1, further comprising determining and storing in association with the connection quality characteristic an indicator that the communication comprises a mobile originated (MO) communication or a mobile terminated (MT) communication based on at least one of the processor-generated event code and the processor-generated event data, wherein the processor-generated event code and the processor-generated event data comprise a function of a plurality of over-the-air (OTA) communication messages.

4. The method of claim 1, wherein generating the connection quality characteristic further comprises generating the connection quality characteristic for each one of simultaneously-occurring calls including at least one of a mobile originated voice call, a mobile originated data call, a mobile originated short message service call, a mobile originated short voice service call, a mobile terminated voice call, a mobile terminated data call, a mobile terminated short message service call, and a mobile terminated short voice service call.

5. The method of claim 4, wherein at least one of the processor-generated event code and the processor-generated event data correspond to additional access origination information, further comprising determining whether the additional access origination information received after an accessed call state is achieved comprises duplicate information or a simultaneously-occurring new call, and determining a new call connection quality characteristic if the simultaneously-occurring new call is determined.

6. The method of claim 5, wherein at least one of the processor-generated event code and the processor-generated event data further correspond to a status of a radio resource control link corresponding to the communication, and further comprising:
associating at least one of the processor-generated event code and the corresponding processor-generated event data with at least one of an event code and an event data both associated with an access origination;
determining the status of the radio resource control link; and
determining the duplicate information or the simultaneously-occurring new call based on the associating and the determined status.

7. The method of claim 4, wherein at least one of the processor-generated event code and the processor-generated event data correspond to additional access origination information, further comprising determining whether the additional access origination information received after a connected call state is achieved comprises duplicate information or a simultaneously-occurring new call.

8. The method of claim 7, further comprising:
associating at least one of the processor-generated event code and the corresponding processor-generated event data with at least one of an event code and an event data both associated with an access origination;
identifying a call type comprising at least one of the mobile originated voice call, the mobile originated data call, the mobile originated short message service call, the mobile originated short voice service call, the mobile terminated voice call, the mobile terminated data call, the mobile terminated short message service call, and the mobile terminated short voice service call; and
determining the duplicate information or the simultaneously-occurring new call based on the associating and the identifying.

9. The method of claim 1, wherein generating further comprises generating the connection quality characteristic comprising a connection-related change between an idle state and an accessed state based on at least one of the processor-generated event code and the corresponding processor-generated event data.

10. The method of claim 9, further comprising associating at least one of the processor-generated event code and the corresponding processor-generated event data with at least one of an event code and an event data both corresponding to the accessed state, and further comprising identifying a call type comprising at least one of the mobile originated voice call, the mobile originated data call, the mobile originated short message service call, the mobile originated short voice service call, the mobile terminated voice call, the mobile terminated data call, the mobile terminated short message service call, and the mobile terminated short voice service call based on at least one of the processor-generated event code and the corresponding processor-generated event data.

11. The method of claim 1, further comprising associating at least one of the processor-generated event code and the corresponding processor-generated event data with at least one of an event code and an event data both corresponding to an access failure condition after identifying an accessed state for the communication, and wherein generating the connection quality characteristic further comprises generating an access failure based on the associating.

12. The method of claim 11, further comprising identifying at least one access failure triggering event, verifying a veracity of the detected at least one access failure triggering event, and wherein generating the access failure is based on a result of the verifying.

13. The method of claim 11, further comprising determining whether the communication device has transitioned from the access failure to an idle state.

14. The method of claim 11, further comprising determining a call type for the communication, and wherein associating comprises associating with at least one of access failure triggering information, release information, call state information and abort information depending on the determined call type.

15. The method of claim 1, further comprising associating at least one of the processor-generated event code and the corresponding processor-generated event data respectively with at least one of an event code and an event data both corresponding to a connection confirmation after identifying an accessed state for the communication, and wherein generating the connection quality characteristic further comprises generating a connected state based on the associating.

16. The method of claim 15, further comprising:
determining one of a plurality of call types;
defining one or more of a plurality of event codes and one or more of a plurality of event data for each of the plurality of call types with the connection confirmation; and
wherein the associating further comprises associating at least one of the processor-generated event code and the corresponding processor-generated event data with a respective one or more of the plurality of event codes and the one or more of the plurality of event data for the determined call type.

17. The method of claim 15, wherein generating the connection quality characteristic further comprises generating an idle state to replace the connected state for a call type.

18. The method of claim 1, further comprising associating at least one of the processor-generated event code and the corresponding processor-generated event data with at least one of an event code and an event data both corresponding to call drop information after identifying a connected state for the communication, and wherein generating the connection quality characteristic further comprises generating a call drop based on the associating.

19. The method of claim 18, further comprising identifying at least one call drop triggering event, verifying a veracity of the detected at least one call drop triggering event, and wherein generating the call drop is based on a result of the verifying.

20. The method of claim 18, further comprising determining whether the communication device is in an idle state corresponding to a call drop.

21. The method of claim 18, further comprising determining a call type for the communication, and wherein associating comprises associating with at least one of call drop triggering information, release information, call state information and abort information depending on the determined call type.

22. The method of claim 1, further comprising identifying a connected state for the communication, determining an occurrence of a call drop or a normal call termination, and wherein generating the connection quality characteristic comprises generating the call drop or the normal call termination based on the determining.

23. The method of claim 22, further comprising identifying a call type for the communication, and wherein the generating of the call drop or the normal call termination is based on the identified call type.

24. The method of claim 1, wherein the communication comprises a call state in an existing radio access technology, further comprising;
identifying handover request information based on the processor-generated event code and the corresponding processor-generated event data, wherein the handover request information corresponds to a request for a handover of the communication between the existing radio access technology and a new radio access technology;
identifying handover success information based on the processor-generated event code and the corresponding processor-generated event data; and
storing the call state in association with the new radio access technology based on the identified handover success information.

25. The method of claim 24, further comprising identifying the communication as having a call type comprising a voice call, and wherein storing the call state is dependent upon the identified call type.

26. The method of claim 24, wherein generating and storing the connection quality characteristic for the communication occurs for each of the existing radio access technology and the new radio access technology.

27. At least one processor configured to determine a connection quality between a communication device and a communications network, comprising:
a first module for receiving from the communication device at least one of communication device processor-generated event code and corresponding communication device processor-generated event data based on execution of a connection quality configuration by the communication device, wherein the processor-generated event code and the processor-generated event data correspond to connection quality aspects of a communication between the communication device and the communications network, wherein the processor-generated event code and the processor-generated event data are based on state information of at least a portion of one or more hardware or software components of the communication device, wherein the state information includes user interface connection information as perceived by a user of the communication device and actual connection information based on transpired communications between the communication device and the communications network, wherein the user interface connection information is different from the actual connection information; and a second module for generating a connection quality characteristic associated with the communication according to analysis of at least one of the processor-generated event code and the processor-generated event data by a connection quality state machine;

wherein the connection quality characteristic relates to one of an access failure, a call drop, or an out of service event;

wherein generating the connection quality characteristic further comprises generating a communication device user-perceived connection quality characteristic, wherein the communication device user-perceived connection quality characteristic is different from a network-perceived connection quality characteristic;

a third module for storing the generated connection quality characteristic corresponding to the communication; and a fourth module for generating a connection quality metric based on a plurality of the connection quality characteristics, the connection quality metric comprising a number of network-perceived call attempts, a number of user-perceived call attempts, and at least one of a number of access failures, call drops, or out of service states, wherein the number of network-perceived call attempts for at least one user-initiated call is different from the number of user-perceived call attempts for the at least one user-initiated call.

28. A computer program product, comprising:
a non-transitory computer-readable medium comprising:
 a first set of codes for causing a computer to receive from the communication device at least one of a communication device processor-generated event code and corresponding communication device processor-generated event data based on execution of a connection quality configuration by the communication device, wherein the processor-generated event code and the processor-generated event data correspond to connection quality aspects of a communication between the communication device and the communications network, wherein the processor-generated event code and the processor-generated event data are based on state information of at least a portion of one or more hardware or software components of the communication device, wherein the state information includes user interface connection information as perceived by a user of the communication device and actual connection information based on transpired communications between the communication device and the communications network, wherein the user interface connection information is different from the actual connection information; and a second set of codes for causing the computer to generate a connection quality characteristic associated with the communication according to analysis of at least one of the processor-generated event code and the processor-generated event data by a connection quality state machine;

wherein the connection quality characteristic relates to one of an access failure, a call drop, or an out of service event;

wherein generating the connection quality characteristic further comprises generating a communication device user-perceived connection quality characteristic, wherein the communication device user-perceived connection quality characteristic is different from a network-perceived connection quality characteristic;

a third set of codes for causing the computer to store the generated connection quality characteristic corresponding to the communication; and a fourth set of codes for causing the computer to generate a connection quality metric based on a plurality of the connection quality characteristics, the connection quality metric comprising a number of network-perceived call attempts, a number of user-perceived call attempts, and at least one of a number of access failures, call drops, or out of service states, wherein the number of network-perceived call attempts for at least one user-initiated call is different from the number of user-perceived call attempts for the at least one user-initiated call.

29. A network device, comprising:
means for receiving from the communication device at least one of a communication device processor-generated event code and corresponding communication device processor-generated event data based on execution of a connection quality configuration by the communication device, wherein the processor-generated event code and the processor-generated event data correspond to connection quality aspects of a communication between the communication device and the communications network, wherein the processor-generated event code and the processor-generated event data are based on state information of at least a portion of one or more hardware or software components of the communication device, wherein the state information includes user interface connection information as perceived by a user of the communication device and actual connection information based on transpired communications between the communication device and the communications network, wherein the user interface connection information is different from the actual connection information; and means for generating a connection quality characteristic associated with the communication according to analysis of at least one of the processor-generated event code and the processor-generated event data by a connection quality state machine;

wherein the connection quality characteristic relates to one of an access failure, a call drop, or an out of service event;

wherein generating the connection quality characteristic further comprises generating a communication device user-perceived connection quality characteristic, wherein the communication device user-perceived connection quality characteristic is different from a network-perceived connection quality characteristic;

means for storing the generated connection quality characteristic corresponding to the communication; and means for generating a connection quality metric based on a plurality of the connection quality characteristics, the connection quality metric comprising a number of network-perceived call attempts, a number of user-perceived call attempts, and at least one of a number of access failures, call drops, or out of service states, wherein the number of network-perceived call attempts for at least one user-initiated call is different from the number of user-perceived call attempts for the at least one user-initiated call.

30. A network device, comprising:
a memory comprising a connection quality state machine and at least one of a communication device processor-generated event code and a corresponding communication device processor-generated event data based on execution of a connection quality configuration by a respective communication device, wherein the processor-generated event code and the processor-generated event data correspond to connection quality aspects of a communication between the communication device and a communications network, wherein the processor-generated event code and the processor-generated event data are based on state information of at least a portion of one or more hardware or software components of the communication device, wherein the state information includes user interface connection information as perceived by a user of the communication device and actual connection information based on transpired communications between the communication device and the communications network, wherein the user interface connection information is different from the actual connection information;
a processor operable to execute the connection quality state machine with respect to at least one of the communication device processor-generated event code and the communication device processor-generated event data to generate and store in the memory a connection quality characteristic associated with the communication;
wherein the connection quality characteristic relates to one of an access failure, a call drop, or an out of service event;
wherein generating the connection quality characteristic further comprises generating a communication device user-perceived connection quality characteristic, wherein the communication device user-perceived connection quality characteristic is different from a network-perceived connection quality characteristic; and
wherein the processor is further operable to generate a connection quality metric based on a plurality of the connection quality characteristics, the connection quality metric comprising a number of network-perceived call attempts, a number of user-perceived call attempts, and at least one of a number of access failures, call drops, or out of service states, wherein the number of network-perceived call attempts for at least one user-initiated call is different from the number of user-perceived call attempts for the at least one user-initiated call.

31. The network device of claim 30, wherein the connection quality state machine is further executable to:
determine and store, in association with the connection quality characteristic, a transition by the communication device between at least two of an idle state, an access state and a connected state, based on the processor-generated event code and corresponding processor-generated event data; and
determine and store a call type associated with the connection quality characteristic.

32. The network device of claim 30, wherein the connection quality state machine is further executable to determine and store in association with the connection quality characteristic an indicator that the communication comprises a mobile originated (MO) communication or a mobile terminated (MT) communication based on at least one of the processor-generated event code and the processor-generated event data, wherein the processor-generated event code and the processor-generated event data comprise a function of a plurality of over-the-air (OTA) communication messages.

33. The network device of claim 30, wherein the connection quality state machine is further executable to generate the connection quality characteristic for each one of simultaneously-occurring calls including at least one of a mobile originated voice call, a mobile originated data call, a mobile originated short message service call, a mobile originated short voice service call, a mobile terminated voice call, a mobile terminated data call, a mobile terminated short message service call, and a mobile terminated short voice service call.

34. The network device of claim 33, wherein at least one of the processor-generated event code and the processor-generated event data correspond to additional access origination information, and wherein the connection quality state machine is further executable to determine whether the additional access origination information received after an accessed call state is achieved comprises duplicate information or a simultaneously-occurring new call, and to determine a new call connection quality characteristic if the simultaneously-occurring new call is determined.

35. The network device of claim 34, wherein at least one of the processor-generated event code and the processor-generated event data further correspond to a status of a radio resource control link corresponding to the communication, and wherein the connection quality state machine is further executable to:
associate at least one of the processor-generated event code and the corresponding processor-generated event data with at least one of an event code and an event data both associated with an access origination;
determine the status of the radio resource control link; and
determine the duplicate information or the simultaneously-occurring new call based on the associating and the determined status.

36. The network device of claim 33, wherein at least one of the processor-generated event code and the processor-generated event data correspond to additional access origination information, and wherein the connection quality state machine is further executable to determine whether the additional access origination information received after a connected call state is achieved comprises duplicate information or a simultaneously-occurring new call.

37. The network device of claim 36, wherein the connection quality state machine is further executable to:
associate at least one of the processor-generated event code and the corresponding processor-generated event data with at least one of an event code and an event data both associated with an access origination;
identify a call type comprising at least one of the mobile originated voice call, the mobile originated data call, the mobile originated short message service call, the mobile originated short voice service call, the mobile terminated voice call, the mobile terminated data call, the mobile terminated short message service call, and the mobile terminated short voice service call; and
determine the duplicate information or the simultaneously-occurring new call based on the associating and the identifying.

38. The network device of claim 30, wherein the connection quality characteristic further comprises a connection-related change between an idle state and an accessed state based on at least one of the processor-generated event code and the corresponding processor-generated event data.

39. The network device of claim 38, wherein the connection quality state machine is further executable to associate at least one of the processor-generated event code and the corresponding processor-generated event data with at least one of an event code and an event data both corresponding to the accessed state, and wherein the connection quality state machine is further executable to identify a call type comprising at least one of the mobile originated voice call, the mobile originated data call, the mobile originated short message service call, the mobile originated short voice service call, the mobile terminated voice call, the mobile terminated data call, the mobile terminated short message service call, and the mobile terminated short voice service call based on at least one of the processor-generated event code and the corresponding processor-generated event data.

40. The network device of claim 30, wherein the connection quality state machine is further executable to associate at least one of the processor-generated event code and the corresponding processor-generated event data with at least one of an event code and an event data both corresponding to an access failure condition after identifying an accessed state for the communication, and wherein the connection quality characteristic further comprises an access failure.

41. The network device of claim 40, wherein the connection quality state machine is further executable to identify at least one access failure triggering event, verify a veracity of the detected at least one access failure triggering event, and wherein generating the access failure is based on a result of the verifying.

42. The network device of claim 40, wherein the connection quality state machine is further executable to determine whether the communication device has transitioned from the access failure to an idle state.

43. The network device of claim 40, wherein the connection quality state machine is further executable to determine a call type for the communication, and wherein the connection quality state machine is further executable to associate at least one of the processor-generated event code and the corresponding processor-generated event data with at least one of access failure triggering information, release information, call state information and abort information depending on the determined call type.

44. The network device of claim 30, wherein the connection quality state machine is further executable to associate at least one of the processor-generated event code and the corresponding processor-generated event data with at least one of an event code and an event data both corresponding to a connection confirmation after identifying an accessed state for the communication, and wherein the connection quality characteristic further comprises a connected state.

45. The network device of claim 44, wherein the connection quality state machine is further executable to:
determine one of a plurality of call types;
define one or more of a plurality of event codes and one or more of a plurality of event data for each of the plurality of call types with the connection confirmation; and
associate at least one of the processor-generated event code and the corresponding processor-generated event data with a respective one or more of the plurality of event codes and the one or more of the plurality of event data for the determined call type.

46. The network device of claim 44, wherein the connection quality state machine is further executable to replace the connected state with an idle state for the connection quality characteristic for a call type.

47. The network device of claim 30, wherein the connection quality state machine is further executable to associate at least one of the processor-generated event code and the corresponding processor-generated event data with at least one of an event code and an event data both corresponding to call drop information after identifying a connected state for the communication, and wherein the connection quality characteristic further comprises a call drop.

48. The network device of claim 47, wherein the connection quality state machine is further executable to identify at least one call drop triggering event, verify a veracity of the detected at least one call drop triggering event, and generate the call drop based on a result of the verifying.

49. The network device of claim 47, wherein the connection quality state machine is further executable to determine whether the communication device is in an idle state corresponding to a call drop.

50. The network device of claim 47, wherein the connection quality state machine is further executable to determine a call type for the communication, and associate at least one of the processor-generated event code and the corresponding processor-generated event data with at least one of call drop triggering information, release information, call state information and abort information depending on the determined call type.

51. The network device of claim 30, wherein the connection quality state machine is further executable to identify a connected state for the communication, determine an occurrence of a call drop or a normal call termination, and wherein the connection quality characteristic further comprises the call drop or the normal call termination based on the determination.

52. The network device of claim 51, wherein the connection quality state machine is further executable to identify a call type for the communication, and wherein the call drop or the normal call termination is determined based on the identified call type.

53. The network device of claim 30, wherein the communication comprises a call state in an existing radio access technology, and wherein the connection quality state machine is further executable to;
identify handover request information based on the processor-generated event code and the corresponding processor-generated event data, wherein the handover request information corresponds to a request for a handover of the communication between the existing radio access technology and a new radio access technology;
identify handover success information based on the processor-generated event code and the corresponding processor-generated event data; and
store the call state in association with the new radio access technology based on the identified handover success information.

54. The network device of claim 53, wherein the connection quality state machine is further executable to identify the communication as having a call type comprising a voice call, and store the call state depending upon the identified call type.

55. The network device of claim 53, wherein the connection quality state machine is further executable to generate and store the connection quality characteristic for the communication for each of the existing radio access technology and the new radio access technology.

56. A method of gathering information to determine a connection quality between a communication device and a communications network, comprising:
receiving at the communication device a collection configuration;
generating at a processing engine of the communication device a plurality of event codes each having a corresponding plurality of event data based on communications between the communication device and a communications network, wherein the plurality of event codes and the corresponding plurality of event data correspond to at least one connection quality characteristic of the communications, wherein the plurality of event codes and the corresponding plurality of event data are based on state information of at least a portion of one or more hardware or software components of the communication device, wherein the state information includes user interface connection information as perceived by a user of the communication device and actual connection information based on transpired communications between the communication device and the communications network, wherein the user interface connection information is different from the actual connection information;

choosing at least one selected event information from the plurality of event codes and the corresponding plurality of event data based on the collection configuration;

forwarding the at least one selected event information for analysis by a connection quality state machine to determine at least one connection quality characteristic associated with the communications;

wherein the connection quality characteristic relates to one of an access failure, a call drop, or an out of service event;

wherein forwarding the at least one selected event information for analysis further comprises forwarding for generation of a communication device user-perceived connection quality characteristic different from a network-perceived connection quality characteristic; and wherein forwarding the at least one selected event information for analysis further comprises forwarding the at least one selected event information for analysis by the connection quality state machine to generate a connection quality metric based on a plurality of the connection quality characteristics, the connection quality metric comprising a number of network-perceived call attempts, a number of user-perceived call attempts, and at least one of a number of access failures, call drops, or out of service states, wherein the number of network-perceived call attempts for at least one user-initiated call is different from the number of user-perceived call attempts for the at least one user-initiated call.

57. At least one processor configured to gather information to determine a connection quality between a communication device and a communications network, comprising:

a first module for receiving at the communication device a collection configuration;

a second module for generating at a processing engine of the communication device a plurality of event codes each having a corresponding plurality of event data based on communications between the communication device and a communications network, wherein the plurality of event codes and the corresponding plurality of event data correspond to at least one connection quality characteristic of the communications, wherein the plurality of event codes and the corresponding plurality of event data are based on state information of at least a portion of one or more hardware or software components of the communication device, wherein the state information includes user interface connection information as perceived by a user of the communication device and actual connection information based on transpired communications between the communication device and the communications network, wherein the user interface connection information is different from the actual connection information;

a third module for choosing at least one selected event information from the plurality of event codes and the corresponding plurality of event data based on the collection configuration;

a fourth module for forwarding the at least one selected event information for analysis by a connection quality state machine to determine at least one connection quality characteristic associated with the communications;

wherein the connection quality characteristic relates to one of an access failure, a call drop, or an out of service event;

wherein forwarding the at least one selected event information for analysis further comprises forwarding for generation of a communication device user-perceived connection quality characteristic different from a network-perceived connection quality characteristic; and wherein forwarding the at least one selected event information for analysis further comprises forwarding the at least one selected event information for analysis by the connection quality state machine to generate a connection quality metric based on a plurality of the connection quality characteristics, the connection quality metric comprising a number of network-perceived call attempts, a number of user-perceived call attempts, and at least one of a number of access failures, call drops, or out of service states, wherein the number of network-perceived call attempts for at least one user-initiated call is different from the number of user-perceived call attempts for the at least one user-initiated call.

58. A computer program product, comprising:

a non-transitory computer-readable medium comprising:

a first set of codes operable to cause a computer to receive at the communication device a collection configuration;

a second set of codes operable to cause the computer to generate at a processing engine of the communication device a plurality of event codes each having a corresponding plurality of event data based on communications between the communication device and a communications network, wherein the plurality of event codes and the corresponding plurality of event data correspond to at least one connection quality characteristic of the communications, wherein the plurality of event codes and the corresponding plurality of event data are based on state information of at least a portion of one or more hardware or software components of the communication device, wherein the state information includes user interface connection information as perceived by a user of the communication device and actual connection information based on transpired communications between the communication device and the communications network, wherein the user interface connection information is different from the actual connection information;

a third set of codes operable to cause the computer to choose at least one selected event information from the plurality of event codes and the corresponding plurality of event data based on the collection configuration;

a fourth set of codes operable to cause the computer to forward the at least one selected event information for analysis by a connection quality state machine to determine at least one connection quality characteristic associated with the communications;

wherein the connection quality characteristic relates to one of an access failure, a call drop, or an out of service event;

wherein forwarding the at least one selected event information for analysis further comprises forwarding for generation of a communication device user-perceived connection quality characteristic different from a network-perceived connection quality characteristic; and wherein forwarding the at least one selected event information for analysis further comprises forwarding the at least one selected event information for analysis by the connection quality state machine to generate a connection quality metric based on a plurality of the connection quality characteristics, the connection quality metric comprising a number of network-perceived call attempts, a number of user-perceived call attempts, and at least one of a number of access failures, call drops, or out of service states, wherein the number of network-perceived call attempts for at least one user-initiated call is different from the number of user-perceived call attempts for the at least one user-initiated call.

59. A communication device, comprising:

means for receiving at the communication device a collection configuration;

means for generating at a processing engine of the communication device a plurality of event codes each having a corresponding plurality of event data based on communications between the communication device and a communications network, wherein the plurality of event codes and the corresponding plurality of event data correspond to at least one connection quality characteristic of the communications, wherein the plurality of event codes and the corresponding plurality of event data are based on state information of at least a portion of one or more hardware or software components of the communication device, wherein the state information includes user interface connection information as perceived by a user of the communication device and actual connection information based on transpired communications between the communication device and the communications network, wherein the user interface connection information is different from the actual connection information;

means for choosing at least one selected event information from the plurality of event codes and the corresponding plurality of event data based on the collection configuration;

means for forwarding the at least one selected event information for analysis by a connection quality state machine to determine at least one connection quality characteristic associated with the communications;

wherein the connection quality characteristic relates to one of an access failure, a call drop, or an out of service event;

wherein forwarding the at least one selected event information for analysis further comprises forwarding for generation of a communication device user-perceived connection quality characteristic different from a network-perceived connection quality characteristic; and wherein forwarding the at least one selected event information for analysis further comprises forwarding the at least one selected event information for analysis by the connection quality state machine to generate a connection quality metric based on a plurality of the connection quality characteristics, the connection quality metric comprising a number of network-perceived call attempts, a number of user-perceived call attempts, and at least one of a number of access failures, call drops, or out of service states, wherein the number of network-perceived call attempts for at least one user-initiated call is different from the number of user-perceived call attempts for the at least one user-initiated call.

60. A communication device, comprising:

a processing engine operable to generate a plurality of event codes each having a corresponding plurality of event data based on communications between the communication device and a communications network, wherein the plurality of event codes and the corresponding plurality of event data correspond to at least one connection quality characteristic of the communications, wherein the plurality of event codes and the corresponding plurality of event data are based on state information of at least a portion of one or more hardware or software components of the communication device, wherein the state information includes user interface connection information as perceived by a user of the communication device and actual connection information based on transpired communications between the communication device and the communications network, wherein the user interface connection information is different from the actual connection information; and a memory in communication with the processing engine, the memory comprising a connection quality module, a collection configuration and at least one selected event information, wherein the connection quality module is executable by the processing engine to choose the at least one selected event information from the plurality of event codes and the corresponding plurality of event data according to the collection configuration, and to forward the at least one selected event information for analysis by a connection quality state machine to determine at least one connection quality characteristic associated with the communications;

wherein the connection quality characteristic relates to one of an access failure, a call drop, or an out of service event;

wherein forwarding the at least one selected event information for analysis further comprises forwarding for generation of a communication device user-perceived connection quality characteristic different from a network-perceived connection quality characteristic; and wherein forwarding the at least one selected event information for analysis further comprises forwarding the at least one selected event information for analysis by the connection quality state machine to generate a connection quality metric based on a plurality of the connection quality characteristics, the connection quality metric comprising a number of network-perceived call attempts, a number of user-perceived call attempts, and at least one of a number of access failures, call drops, or out of service states, wherein the number of network-perceived call attempts for at least one user-initiated call is different from the number of user-perceived call attempts for the at least one user-initiated call.

61. The method of claim 1, wherein the connection quality metric further comprises at least one of a rate of network-perceived call attempts, rate of access failures, rate of call drops, and rate of out of service states, and at least one of a rate of user-perceived access failures, rate of call drops, and rate of out of service states.

62. The method of claim 56, wherein the connection quality metric further comprises at least one of a rate of network-perceived call attempts, rate of access failures, rate of call drops, and rate of out of service states, and at least one of a rate of user-perceived access failures, rate of call drops, and rate of out of service states.

* * * * *